US012802494B2

(12) United States Patent
(10) Patent No.: US 12,802,494 B2
(45) Date of Patent: Nov. 17, 2026

Murai et al.

(54) NOTIFICATION METHOD AND NOTIFICATION SYSTEM

(71) Applicant: KAWASAKI MOTORS, LTD., Hyogo (JP)

(72) Inventors: Tatsumasa Murai, Akashi (JP); Hirotoshi Shimura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 51 days.

(21) Appl. No.: 18/439,776

(22) Filed: Feb. 13, 2024

(65) Prior Publication Data

US 2025/0259483 A1 Aug. 14, 2025

(51) Int. Cl.
*G07C 5/00* (2006.01)

(52) U.S. Cl.
CPC .................................... *G07C 5/006* (2013.01)

(58) Field of Classification Search
CPC ...................................................... G07C 5/006
See application file for complete search history.

(56) References Cited

U.S. PATENT DOCUMENTS

| | | | | |
|---|---|---|---|---|
| 8,965,624 B2* | 2/2015 | Hosein | G06Q 30/08 | 701/29.6 |
| 2005/0049895 A1* | 3/2005 | Kasahara | G06Q 10/20 | 705/305 |
| 2007/0156311 A1* | 7/2007 | Elcock | G07C 5/008 | 701/31.4 |
| 2010/0161171 A1* | 6/2010 | Valentine | B65B 37/04 | 701/31.4 |
| 2015/0057875 A1* | 2/2015 | McGinnis | G07C 5/0841 | 701/31.6 |
| 2015/0127212 A1* | 5/2015 | Chacon | G01S 19/14 | 701/32.4 |
| 2017/0305369 A1 | 10/2017 | Ono et al. | | |
| 2018/0130267 A1* | 5/2018 | Jones | G07C 5/008 | |
| 2018/0240287 A1* | 8/2018 | Watson | G07C 5/008 | |
| 2019/0378350 A1* | 12/2019 | DeRouen | G07C 5/008 | |
| 2020/0013237 A1 | 1/2020 | Kanbe et al. | | |
| 2024/0013164 A1* | 1/2024 | Derouen | G07C 5/0808 | |

FOREIGN PATENT DOCUMENTS

| | | | |
|---|---|---|---|
| JP | 2002-012132 | A | 1/2002 |
| JP | 2003-137079 | A | 5/2003 |
| JP | 2017-194398 | A | 10/2017 |
| JP | 6802359 | B2 | 12/2020 |

* cited by examiner

*Primary Examiner* — Hussein Elchanti
(74) *Attorney, Agent, or Firm* — XSENSUS LLP

(57) ABSTRACT

A notification method of issuing a notification of arrival of maintenance of a vehicle includes: a step of acquiring, by a portable device, driving information from the vehicle through communication, the driving information indicating a driving state of the vehicle; and a step of outputting notification information regarding the maintenance of the vehicle to a notification device included in the portable device in case that the driving information satisfies a predefined notification condition.

15 Claims, 13 Drawing Sheets

NOTIFICATION METHOD AND NOTIFICATION SYSTEM

TECHNICAL FIELD

The present disclosure relates to a notification method and a notification system that each issue a notification of the arrival of the maintenance time of a vehicle.

BACKGROUND

As technology related to the maintenance of a wheeled vehicle, JP 2002-12132A describes a method in which a processing unit sets the next inspection time on the basis of data inputted to an input terminal of a management company of the wheeled vehicle.

SUMMARY

It is desired to notify a user of the maintenance of a vehicle at an appropriate timing.

An object of the present disclosure is to notify a user of the maintenance of a vehicle at an appropriate timing.

According to a first aspect of the present disclosure, there is provided a notification method of issuing a notification of arrival of maintenance of a vehicle. The notification method includes: acquiring, by a portable device, driving information from the vehicle through communication, the driving information indicating a driving state of the vehicle; and outputting notification information regarding the maintenance of the vehicle to a notification device included in the portable device in case that the driving information satisfies a predefined notification condition.

It is to be noted that the vehicle is a mobile object that includes a propulsion source such as an engine which is an internal combustion engine or an electric motor, and is movable with a user therein in this aspect.

According to a second aspect of the present disclosure, there is provided a notification system that issues a notification of arrival of maintenance of a vehicle. The notification system includes: a portable device including a notification device; and a vehicle that is communicable with the portable device. The portable device acquires driving i from the vehicle through communication, the driving information indicating a driving state of the vehicle, and outputs notification information regarding maintenance of the vehicle to the notification device in case that the driving information satisfies a predefined notification condition.

DETAILED DESCRIPTION OF THE EMBODIMENTS

<Embodiment>

Figure 1:
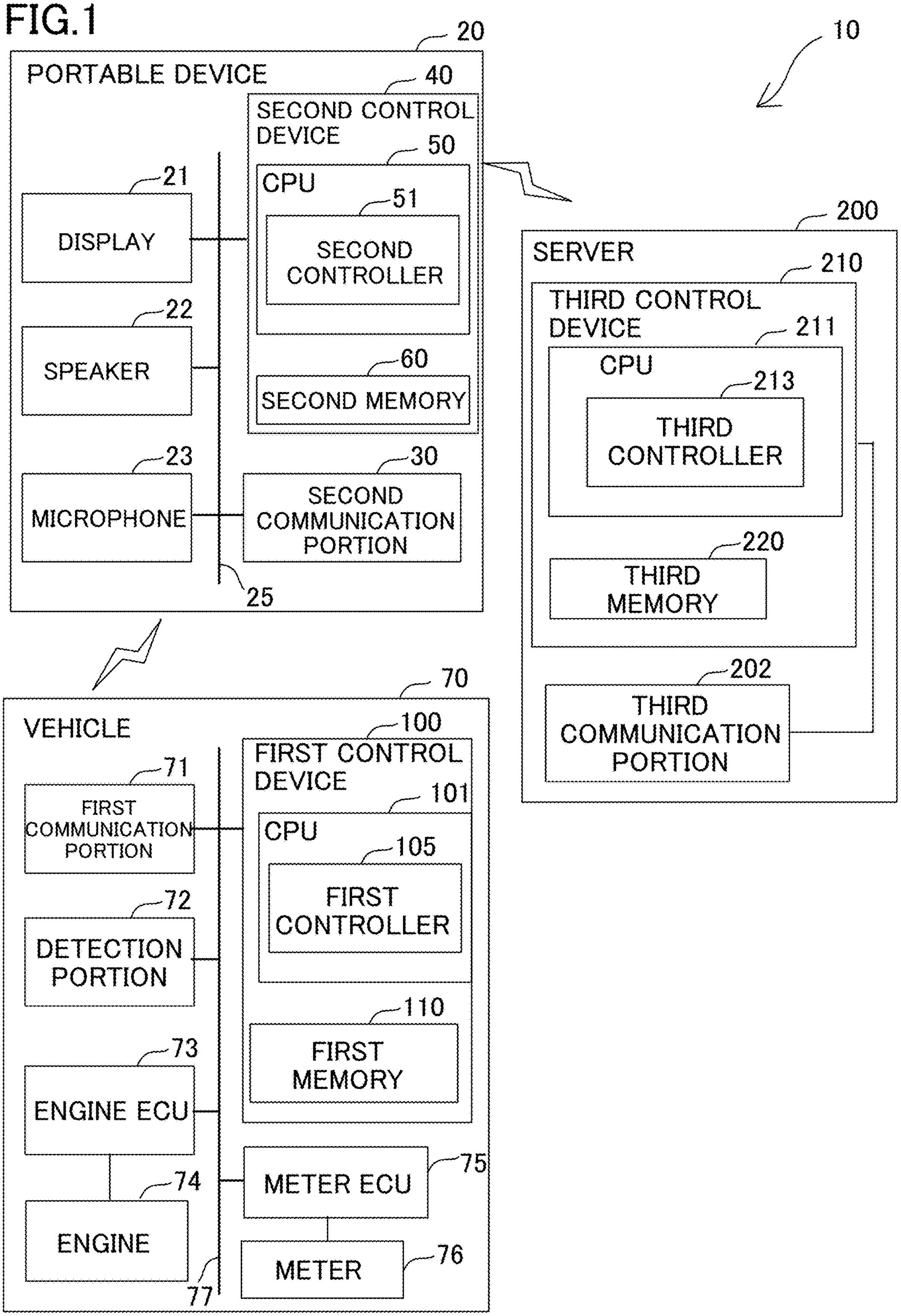
FIG. 1 is a schematic configuration diagram of a notification system in an embodiment.

A notification system 10 serving as an embodiment of the present disclosure illustrated in FIG. 1 chiefly includes a vehicle 70 and a portable device 20 that wirelessly communicates with the vehicle 70. The notification system 10 notifies a user of the portable device 20 of the arrival of the maintenance time of the vehicle 70. Specifically, the notification system 10 outputs notification information regarding maintenance to a notification device of the portable device 20. The portable device 20 in the present embodiment is a communication terminal that is carriable with a user. In the present embodiment, the portable device 20 is implemented as a mobile phone (Cell Phone) capable of making a call through a public line.

The vehicle 70 includes a mobile object that includes a propulsion source which drives a driving wheel and allows an occupant to move. In the present embodiment, the vehicle 70 is a utility vehicle (UV). The utility vehicle is an off-roading wheeled vehicle that chiefly travels in unpaved mountain roads or forest roads, muddy areas or rocky areas, or the like in addition to grassland, gravel roads, farm land, and sandy areas. A utility vehicle exemplified in FIG. 13 includes low pressure tires 781, in other words, balloon tires. This makes it easier to suppress, even in case that the utility vehicle travels on an uneven road surface, a shake that is given to an occupant and increase the ground contact area between each tire and the road surface. The utility vehicle includes a cargo bed 782 that is loaded with luggage to carry out luggage transportation work. This makes it possible to carry out various kinds of work such as luggage transportation, hunting, agriculture, livestock, security, and snow removal in addition to means of transporting an occupant outdoors. In the present embodiment, the vehicle 70 includes an engine 74 as a propulsion source. The engine 74 is an internal combustion engine.

The vehicle 70 included in the notification system chiefly includes a first control device 100, a first communication portion 71, a detection portion 72, an engine ECU 73 and the engine 74, and a meter ECU 75 and a meter 76. The first control device 100 is mutually connected to the first communication portion 71, the detection portion 72, the engine ECU 73 and the engine 74, and the meter ECU 75 and the meter 76 through a CAN (Controller Area Network) bus 77.

The first communication portion 71 transmits and receives wireless signals to and from a second communication portion 30 included in the portable device 20 under the control of the first control device 100. For example, the first communication portion 71 includes an antenna that transmits and receives wireless radio waves and a communication circuit that transmits and receives wireless radio waves including predefined information. For example, the communication circuit may be implemented as an RF circuit that modulates predetermined information to radio signals to transmit the predetermined information and demodulates radio signals to extract predetermined information. The first communication portion 71 is configured to be capable of communicating with the portable device 20 carried by a user positioned in the riding space of the vehicle 70. In the present embodiment, the first communication portion 71 includes a BLE communication device. The BLE communication device transmits and receives wireless signals through a BLE communication antenna provided to the vehicle 70 by using the BLE (Bluetooth Low Energy (R)) standard. As another embodiment, the first communication portion 71 may include a communication device that transmits and receives wireless signals by using not only the BLE standard, but also another wireless communication standard such as a Wi-Fi (Wireless Fidelity (R)) standard, an infrared communication standard, an RFID (Radio Frequency Identification) standard, or an NFC (Near Field Communication) standard.

The detection portion 72 is implemented as a sensor that detects information related to the driving of the vehicle 70. The information related to the driving of the vehicle 70 may include information indicating at least one of the traveling state of the vehicle 70, the state of the propulsion source, or the operation state of a driver. Examples of a sensor that detects the traveling state of the vehicle 70 include a vehicle speed sensor, a wheel speed sensor of a front or rear wheel, a longitudinal acceleration sensor, an inertial sensor that detects a vehicle attitude or angular velocity, a sensor that detects a vertical vibration of the vehicle body, a sensor that detects the vertical acceleration of a wheel, and a vehicle position/attitude sensor including a GPS or a GNSS. Examples of a sensor that detects the state of the propulsion source include an engine speed sensor, a gear position sensor, a throttle angle sensor, an intake air temperature sensor, an oil temperature sensor, and an intake pressure sensor. Examples of a sensor that detects the operation state of a driver include an accelerator operation amount sensor, a brake operation amount sensor, and a gear shift operation sensor. The detection portion 72 outputs a result of detection to the first control device 100 while supplied with power from a battery mounted on the vehicle 70.

The first control device 100 is configured as an ECU (Electronic Control Unit) including a CPU 101, a first memory 110, and an unillustrated interface. The CPU 101 is implemented as a processing circuit that functions as a first controller 105 by loading and executing a program stored in the first memory 110. The first 110 memory stores, for example, identification information with which the vehicle 70 is identified. It is to be noted that the first memory 110 and various memories described below each include a volatile memory and a nonvolatile memory. The volatile memory may be a RAM (Random Access Memory). The nonvolatile memory may include at least one of an EEPROM (Electrically Erasable Programmable Read-Only Memory) or an HDD (Hard Disk Drive).

The first controller 105 executes notification control regarding at least the maintenance of the vehicle 70. The notification control includes updating and saving a driving integrated value of the vehicle 70 and transmitting the driving integrated value through the first communication portion 71.

Control that is executed by the first controller 105 to update and save a driving integrated value will be described. In the present embodiment, the first controller 105 includes a timer and detects elapsed time. In addition, the first controller 105 calculates the traveling speed of the vehicle 70 on the basis of the detected wheel rotation speed or positional information about the wheeled vehicle. In the present embodiment, the first controller 105 receives a result of the detection by the detection portion 72 and calculates a driving integrated value that increases along with the driving of the vehicle 70. The first controller 105 stores the calculated driving integrated value in the nonvolatile memory of the first memory 110.

The control to update and save a driving integrated value will be described more specifically. The first controller 105 reads out, from the first memory 110, driving integrated values stored in the past. The first controller 105 adds values to be newly integrated to the read driving integrated values on the basis of results of detection by the detection portion 72 and updates the driving integrated values. The first controller 105 replaces the driving integrated values in the first memory 110 with the updated driving integrated values and stores the updated driving integrated values. In the present embodiment, the driving integrated values are total driving distance and total driving time. The total driving distance corresponds to accumulated movement distance indicating the movement made with the propulsion source from manufacturing the vehicle 70 to detecting the newest value by the detection portion 72. The total driving time corresponds to accumulated movement time for which the propulsion source is driven from manufacturing the vehicle 70 to detecting the newest value by the detection portion 72. The total driving distance and the total driving time described above each correspond to "driving information" according to the present disclosure.

Next, control that is executed by the first controller 105 through the first communication portion 71 to transmit a driving integrated value will be described. The first controller 105 determines whether or not an output request condition of the driving information is satisfied. Each time the first controller 105 determines that the output requirement is satisfied, the first controller 105 transmits the driving information about the vehicle 70 to the portable device 20 through the first communication portion 71. The output request condition of the driving information may be, for example, that the portable device 20 is positioned within the communication range of the first communication portion 71 or that the first communication portion 71 receives a predetermined signal from the portable device 20.

It is to be noted that it is sufficient if the first controller 105 includes the above-described functions of updating and saving a driving integrated value and transmitting the driving integrated value through the first communication portion 71. The first controller 105 may be provided to an entity different from an existing control device in the vehicle 70 or may be integrally provided to the existing control device. For example, the first controller 105 may be implemented as one of the functions of the engine ECU 73, the meter ECU 75, the first communication portion 71, or the like.

Next, the portable device 20 will be specifically described. Application software that issues a notification of the arrival of the maintenance time of the vehicle 70 is installed in the portable device 20. The following also refers to this application as a maintenance application. It is possible for a user to receive a notification of the arrival of maintenance from the portable device 20 by starting the maintenance application. In addition, even in case that the maintenance application is not started, it is possible for the user to receive a notification of the arrival of maintenance from the portable device 20 by setting the permission of a push function in the portable device 20 in advance.

In the present embodiment, the portable device 20 includes a display 21, a speaker 22, a microphone 23, a second control device 40, and the second communication portion 30 as hardware components. The respective portions 21, 22, 23, 40, and 30 are connected to each other by a bus 25.

The second communication portion 30 is configured to be capable of communicating with the first communication portion 71. As with the first communication portion 71, the second communication portion 30 includes an antenna that transmits and receives wireless radio waves and a communication circuit that transmits and receives wireless radio waves including predefined information. In the present embodiment, the second communication portion 30 includes a BLE communication circuit. It is preferable that the second communication portion 30 further include a wireless communication circuit which wirelessly communicates with a server 200 connected to the Internet.

The second control device 40 is configured as a computer including a CPU 50, a second memory 60, and an unillustrated interface. The CPU 50 functions as a second controller 51 by loading and executing a program stored in the second memory 60. The second controller 51 executes maintenance-related notification processing of issuing a notification of the arrival of maintenance. In addition, the second controller 51 controls the display 21 or the speaker 22 to cause the display 21 or the speaker 22 to output various kinds of information. The display 21 and the speaker 22 each correspond to a "notification device" that notifies a user of maintenance information. In addition, in the present embodiment, the display 21 functions as a touch screen. The following chiefly uses the display 21 as the notification device. It is to be noted that the second controller 51 causing the notification device to output information specifically corresponds to the second controller 51 transmitting, to the notification device, a command to cause information to be outputted and the notification device issuing a notification of the information in accordance with the command. In addition, the second controller 51 receives an input operation (input command) by a user through the touch screen function of the display 21 or an input operation such as a voice instruction through the microphone 23. In this case, the display 21 and the microphone 23 each correspond to an "input device" that receives an operation by a user.

As illustrated in FIG. 1, the notification system 10 according to the present embodiment further includes the server 200. The server 200 is installed at a facility apart from the vehicle 70. The server 200 includes a third communication portion 202 and a third control device 210. The third communication portion 202 includes a communication circuit that communicates with the portable device 20 through a base station. The portable device 20 is connected to the Internet. The third control device 210 is configured as a computer including a CPU 211, a third memory 220, and an unillustrated interface. The CPU 211 functions as a third controller 213 by loading and executing a program stored in the third memory 220.

It is possible for the server 200 to acquire pieces of information from the plurality of respective portable devices 20 in each of which application software that issues a notification of the arrival of maintenance is installed. It is preferable that the server 200 tally up and classify the pieces of information acquired from the respective portable devices and store the pieces of information in a database. In addition, the server 200 may be configured to be capable of transmitting information in the database to another server different from the server 200 in response to a request. The other server may be provided, for example, in at least one of a management group that manages the vehicle 70, a sales company, a maintenance company, or a vehicle manufacturing company.

The third memory 220 stores a driving log or a maintenance history transmitted from the portable device 20. The driving log and the maintenance history will be described below. It is to be noted that the server 200 is not an essential component in the notification system 10. In another embodiment, the server 200 may be omitted.

The following describes the maintenance-related notification processing (that will also be referred to as "notification processing" below) that is executed by the second controller 51 of the portable device 20. The second controller 51 executes initial setting processing before the notification processing when the application is started for the first time.

Figure 2:
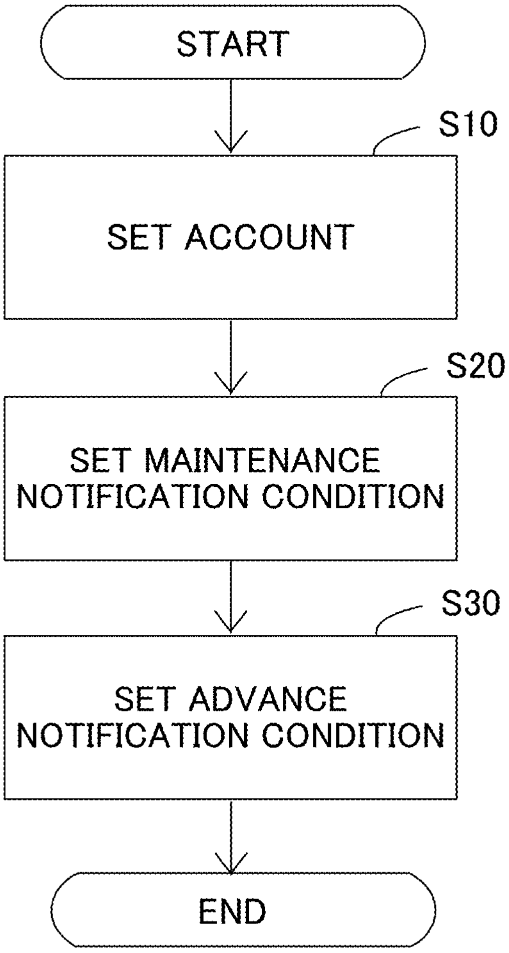
FIG. 2 is a diagram illustrating a flow of initial setting processing that is executed by a second controller.

FIG. 2 illustrates a flow of the initial setting processing. In the initial setting processing, the second controller 51 of the portable device 20 sets an account including a user ID (step S10), sets a maintenance notification condition (step S20), and sets an advance notification condition (step S30). The maintenance notification condition and the advance notification condition each correspond to a "notification condition".

Figure 3:
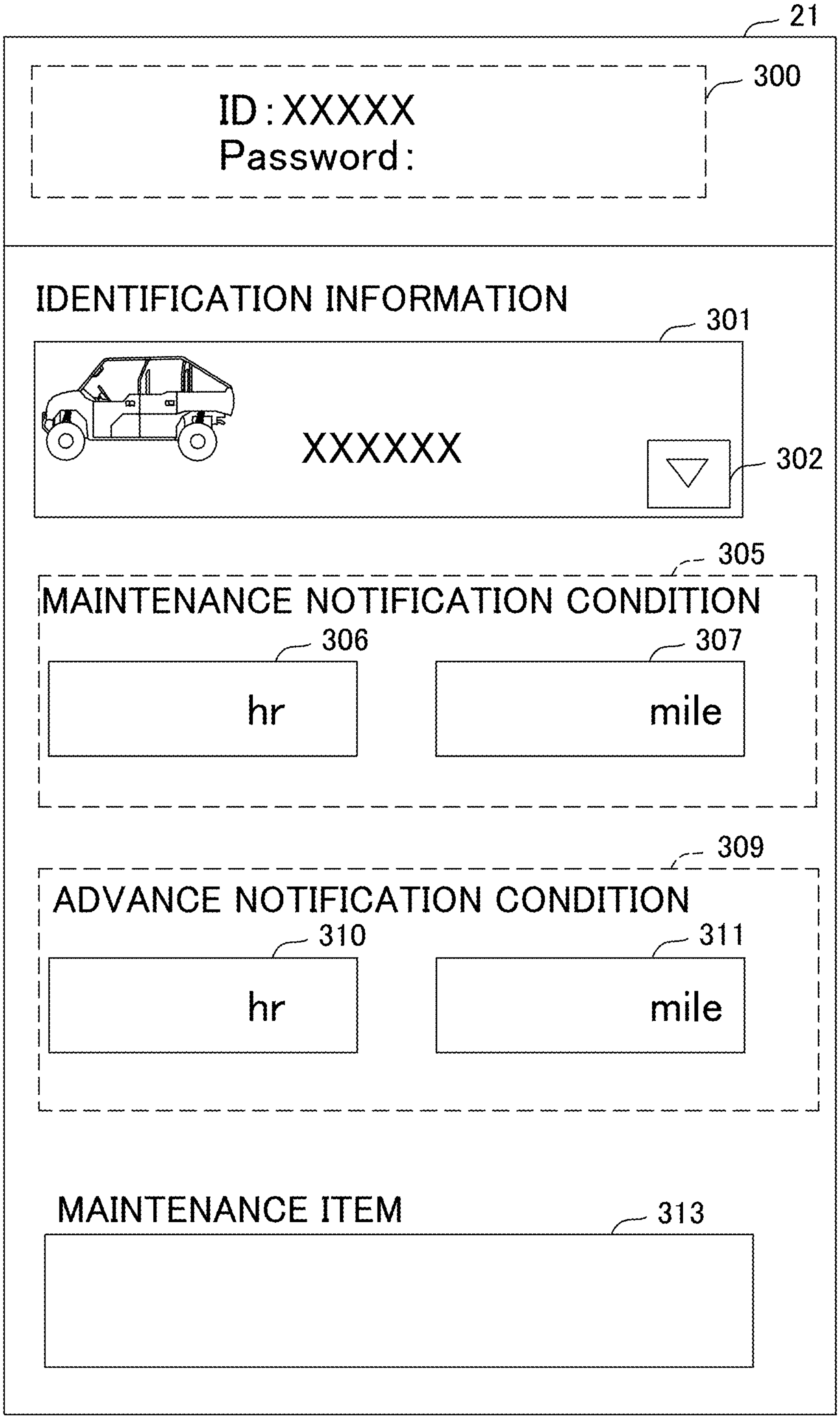
FIG. 3 is a diagram illustrating an example of an initial setting screen that is outputted to a display of a portable device.

In the present embodiment, the second controller 51 outputs an initial setting screen as exemplified in FIG. 3 to the display 21. In step S10 (FIG. 2), the second controller 51 prompts a user to register an account and input identification information about the vehicle 70, for example, by displaying, for example, a cursor in an input region 300 of an account and an input region 301 of identification information (FIG. 3). The identification information is a number unique to the vehicle 70. In case that the vehicle 70 is a wheeled vehicle, the identification information is, for example, a vehicle identification number (VIN) that is individually set for each of wheeled vehicles. The second controller 51 (or the server 200 described below) generates link information in advance that associates the identification information transmitted from the wheeled vehicle and the user account information and stores the link information. Upon acquiring the identification information from the wheeled vehicle, the second controller 51 refers to the link information and issues a maintenance notification in case that the acquired identification information is identification information associated with the user account. Executing various kinds of processing on the basis of the link information in this way offers an advantage that a maintenance notification is issued for a wheeled vehicle identified in advance even in case that the user uses a plurality of wheeled vehicles. In addition, it is advantageous that a maintenance notification is issued for a user identified in advance even in case that one wheeled vehicle is used by a plurality of users.

It is possible for the user to input the identification information about the vehicle 70 to the input region 301 of identification information by making an operation with the touch screen function of the display 21. It is to be noted that the second controller 51 may acquire the identification information from the vehicle 70 by communicating with the vehicle 70 through the second communication portion 30. The identification information does not have to be a vehicle identification number (VIN). For example, the identification information may be identification information that is set uniquely to the second communication portion 30.

As illustrated in FIG. 3, the input region 301 of identification information is provided with a pull-down tab 302. It is possible for a user to associate a plurality of vehicles including different pieces of identification information with his or her own account (user ID) by operating the pull-down tab 302. For example, it is possible to associate, in case that the user owns a plurality of vehicles, the respective vehicles with one account. In addition, in case that a plurality of vehicles is registered in an account, the user operates the tab 302 to select a vehicle. This allows the user to execute various operations regarding the maintenance of the selected vehicle 70 and obtain various kinds of information.

FIG. 2 will be referred to again. Once an account is set, the second controller 51 prompts a user to input a maintenance notification condition in step S20, for example, by displaying a cursor in an input region 305 of a maintenance notification condition (FIG. 3). In the present embodiment, the maintenance notification condition may include at least one of (i) preset maintenance notification time being reached by count time that is the time obtained by counting the driving time of the vehicle 70 from a predetermined time (referred to as a starting time below) or (ii) preset maintenance notification distance being reached by count distance that is the distance obtained by counting the driving distance of the vehicle 70 from the starting time. In addition, the maintenance notification condition may include a preset maintenance date and time being reached by the detected current date and time. For example, the plurality of maintenance notification conditions may be set. In this case, in case that the plurality of conditions includes a condition that is achieved the earliest (that is, any one of the plurality of conditions is achieved), the second controller 51 may determine that the maintenance notification conditions are satisfied. In addition, a default value may be set for a maintenance notification condition such as maintenance notification distance or maintenance notification time. Alternatively, a user may optionally select a maintenance notification condition. In addition, a maintenance notification condition is not only selected by a user, but may also be individually set for each wheeled vehicle in accordance with the use frequency of the vehicle, the traveling operation tendency of a driver, or the tendency of a load on the wheeled vehicle.

When the maintenance application is set for the first time, the starting time in (i) and (ii) above may be the date and time of the first setting. The count time and the count distance are the time and the distance obtained by counting again the total driving time and the total driving distance on the basis of the starting time. As illustrated in FIG. 3, an input region 306 of maintenance notification time and an input region 307 of maintenance notification distance are indicated in the input region 305 of a maintenance notification condition. The maintenance notification condition is set by inputting time or distance desired by a user to at least one of the input region 306 or the input region 307. It is to be noted that default distance and time may be displayed in the input regions 306 and 307 in another embodiment. In this case, it is possible for the user to set the maintenance notification time and the maintenance notification distance by selecting or changing the default distance and time. It is to be noted that the count time and the count distance each correspond to a "count amount". In addition, the maintenance notification time and the maintenance notification distance each correspond to a "maintenance setting value".

Once a maintenance notification condition is set, the second controller 51 prompts a user to input an advance notification condition in step S30, for example, by displaying a cursor in an input region 309 of an advance notification condition. In the present embodiment, the advance notification condition may include at least one of (iii) the count time reaching advance notification time shorter than the maintenance notification time or (iv) the count distance reaching advance notification distance shorter than the maintenance notification distance. A plurality of conditions may be set as such advance notification conditions. In this case, in case that the plurality of conditions includes a condition that is achieved the earliest (that is, any one of the plurality of conditions is achieved), the second controller 51 may determine that the advance notification conditions are satisfied. It is to be noted that the advance notification time and the advance notification distance each correspond to a "advance setting value". As illustrated in FIG. 3, an input region 310 of advance notification time and an input region 311 of advance notification distance are indicated in the input region 309 of an advance notification condition. The advance notification condition is set by inputting desired time or distance to at least one of the items of the input regions 310 and 311 corresponding to the maintenance notification conditions. In another embodiment, the advance notification time and the advance notification distance may be predefined in relation to the maintenance notification time and the maintenance notification distance. For example, the advance notification time may be time that is ten hours shorter than the maintenance notification time. For example, the advance notification distance may be the distance that is 100 miles (miles) shorter than the maintenance notification distance. For example, the advance notification date and time may be one week earlier than the maintenance date and time. The values of such advance notification time and advance notification distance are examples and other values may be adopted. In addition, a default value may be set for an advance notification condition such as advance notification distance or advance notification time. Alternatively, a user may selectively select an advance notification condition. In addition, an advance notification condition is not only selected by a user, but may also be individually set for each wheeled vehicle in accordance with the use frequency of the vehicle, the traveling operation tendency of a driver, or the tendency of a load on the wheeled vehicle.

In the present embodiment, the second controller 51 further prompts a user to input a maintenance item in step S20 or step S30, for example, by displaying a cursor in an input region 313 of a maintenance item. It is possible for the user to input a desired maintenance item, a memorandum related to the maintenance, and the like to the input region 313. Examples of maintenance items include engine oil, an oil filter, gear case oil, a brake pad, a brake fluid, a coolant, tire replacement, tire inflation pressure, an air cleaner, a wheel part, a CVT belt, and the like as a periodic inspection example in case that the vehicle 70 is a utility vehicle or a motorcycle. It is to be noted that the third memory 220 of the server 200 may store the relationship between the identification information, and the type of vehicle and a maintenance item (e.g., each part) corresponding to the identification information in another embodiment. In addition, the third memory 220 may store the default values of a maintenance notification condition and an advance notification condition for each piece of identification information. The second controller 51 may assist a user in performing an operation (setting operation) of inputting a maintenance item by transmitting the identification information about the vehicle 70 to the server 200 and acquiring the maintenance item and the default values of the vehicle 70 corresponding to the identification information to make an output to the input region 313.

Once a maintenance notification condition (step S20) and an advance notification condition (step S30) are set as described above, the portable device 20 stores the maintenance notification condition and the advance notification condition in the second memory 60 in association with the account and the identification information set in step S10 and ends the initial setting processing.

Figure 4:
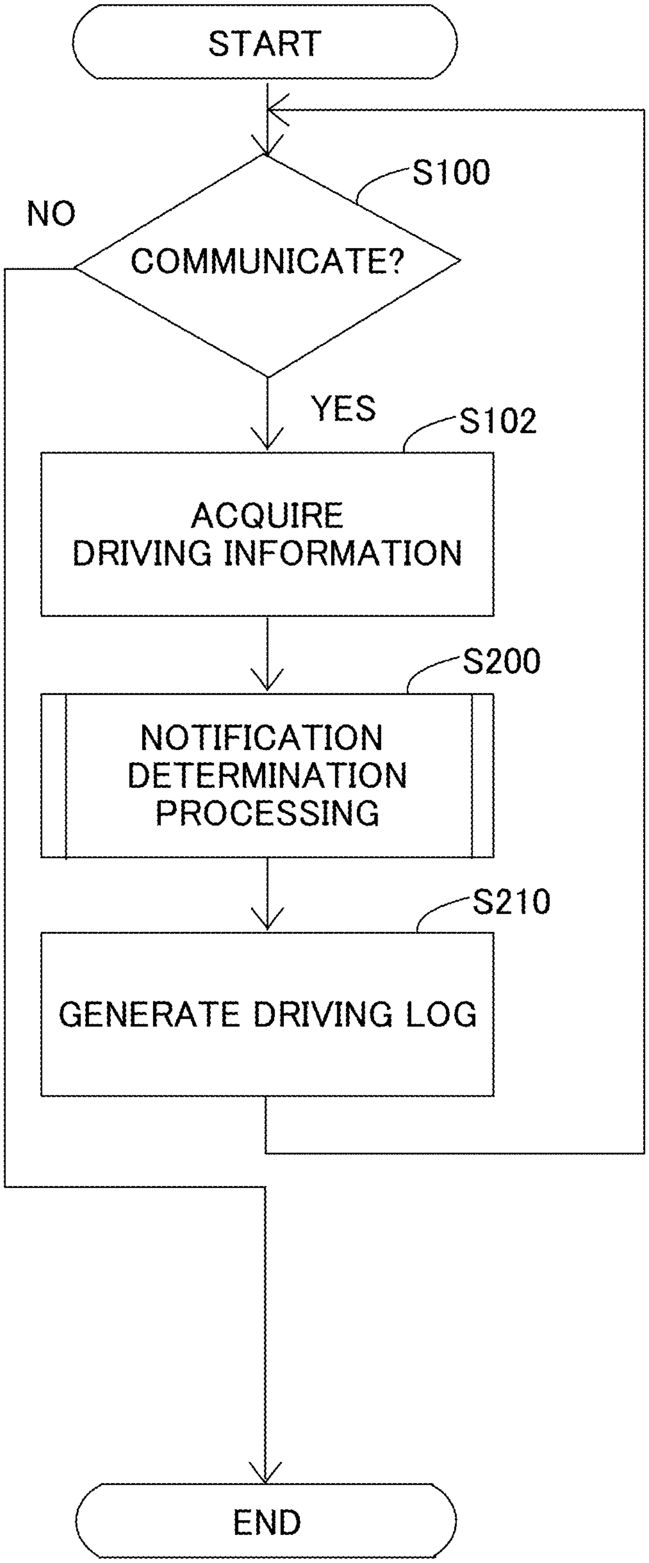
FIG. 4 is a diagram illustrating a flow of notification processing.

After the initial setting processing ends, the second controller 51 executes the notification processing illustrated in FIG. 4 in case that the maintenance application is on. The second controller 51 of the portable device 20 first determines in step S100 whether or not communication with the vehicle 70 is established. For example, the second controller 51 transmits a request signal including the identification information stored in the second memory 60 to the vehicle 70 through the second communication portion 30. If the first controller 105 of the vehicle 70 is supplied with power from a battery, the first controller 105 receives the request signal through the first communication portion 71. In case that the identification information included in the received request signal matches the identification information about the vehicle 70 stored in the first memory 110, the first controller 105 transmits a response signal. In case that the second controller 51 receives the response signal, the second controller 51 advances the processing to step S102.

In step S102, the second controller 51 acquires driving information from the vehicle 70. In the present embodiment, the second controller 51 transmits a request signal to the vehicle 70 through the second communication portion 30. The request signal requests the transmission of the driving information. The first controller 105 of the vehicle 70 transmits the total driving time and the total driving distance to the portable device 20 in response to the request signal acquired through the first communication portion 71. The total driving time and the total driving distance are pieces of driving information stored in the first memory 110.

In step S200, the second controller 51 executes notification determination processing. The notification determination processing is processing of determining with the pieces of driving information acquired from the vehicle 70, and the set maintenance notification condition and advance notification condition whether or not to output the information regarding the maintenance to the notification device of the portable device 20 and outputting the information regarding the maintenance in accordance with a result of the determination.

Figure 5:
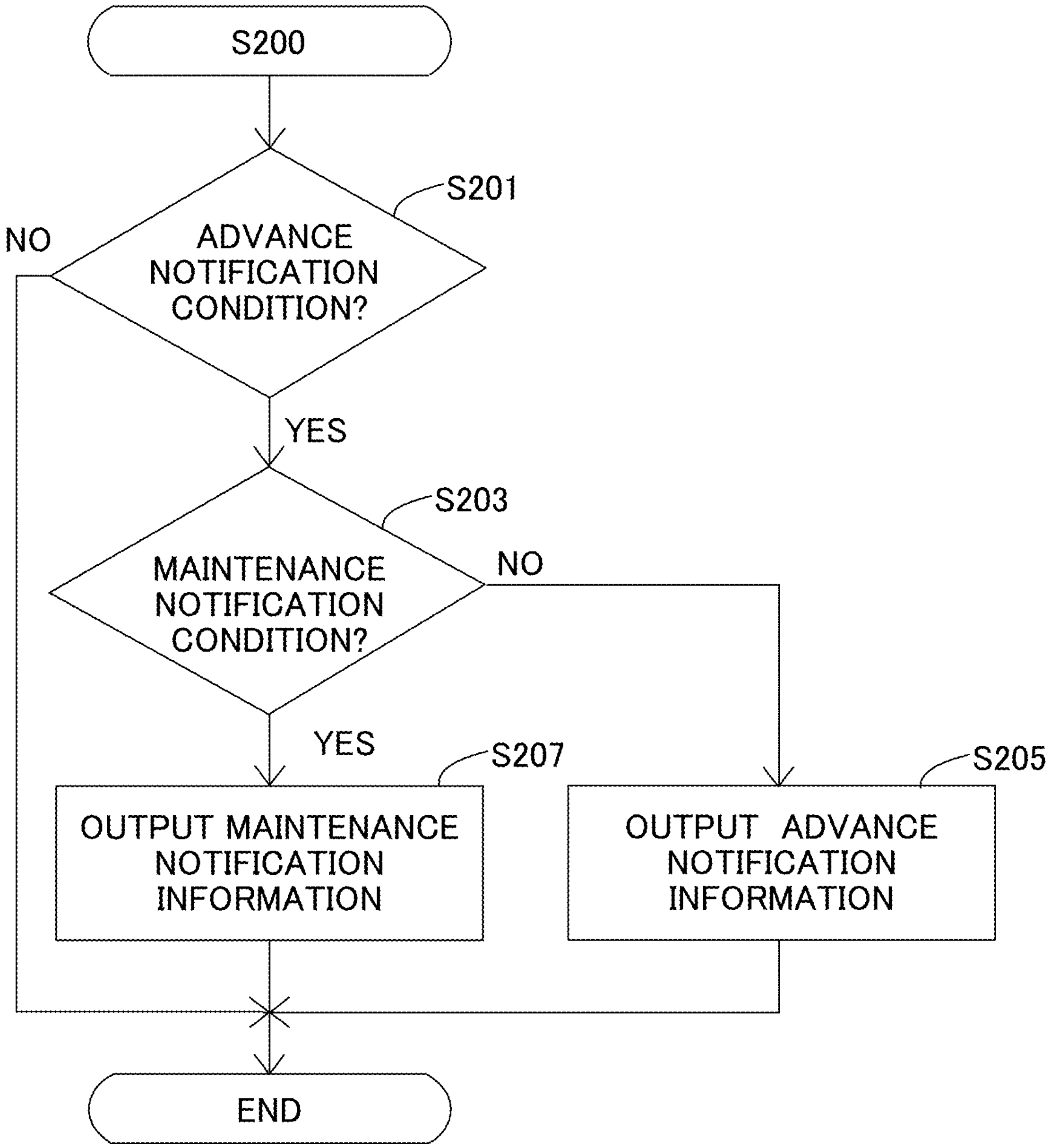
FIG. 5 is a diagram illustrating a flow of notification determination processing.

FIG. 5 is a flowchart of the notification determination processing. In step S201, the second controller 51 determines whether or not an advance notification condition is satisfied. In the present embodiment, as described above, the advance notification condition may be at least one of (iii) the count time reaching the advance notification time or (iv) the count distance reaching the advance notification distance. The second controller 51 calculates the count time and the count distance based on the starting time stored in the second memory 60 by using the pieces of driving information acquired from the vehicle 70. The second controller 51 determines (iii) and (iv) above by using the calculated count time and count distance. In case that at least one of (iii) or (iv) above is satisfied, the second controller 51 makes an affirmative determination for step S201 and advances the processing to step S203. Meanwhile, in case that none of the advance notification conditions are not satisfied (NO in step S201), the second controller 51 ends the notification determination processing in step S200.

In case that the advance notification condition is satisfied (YES in step S201), the second controller 51 further determines in step S203 whether or not the maintenance notification condition is satisfied. As described above, the maintenance notification condition in the present embodiment is at least one of (i) the count time reaching the maintenance notification time or (ii) the count distance reaching the maintenance notification distance. As in step S201, the second controller 51 determines (i) and (ii) above by using the calculated count time and count distance. In case that none of (i) or (ii) above are satisfied, the second controller 51 makes a negative determination for step S203 and advances the processing to step S205.

Figure 6:
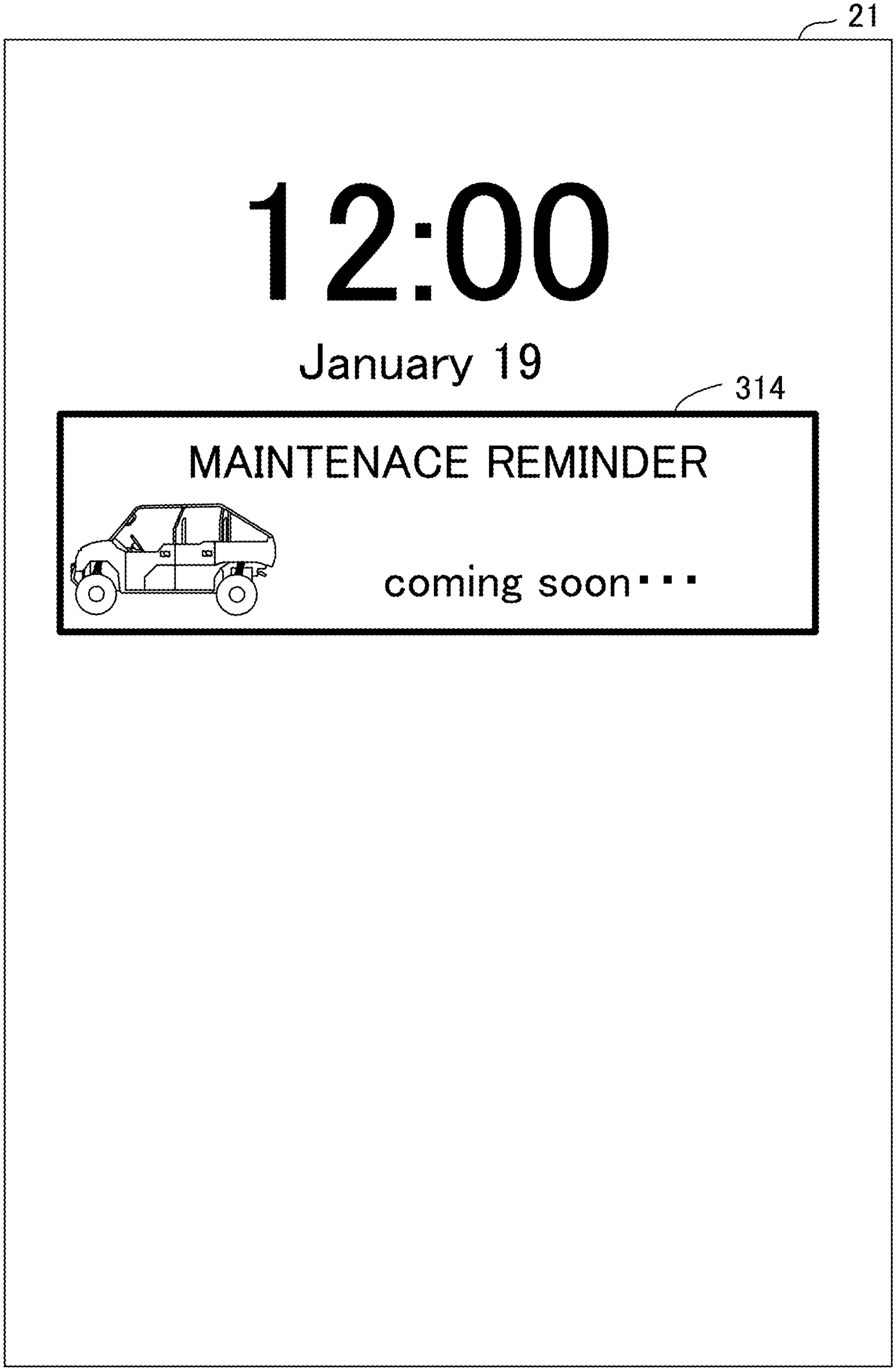
FIG. 6 is a diagram illustrating an example of advance notification information outputted to the display of the portable device.

In step S205, the second controller 51 outputs advance notification information to the display 21. The advance notification information is information that is outputted to the notification device of the portable device 20 in case that the advance notification condition is satisfied (YES in step S201) and in case that the maintenance notification condition is not satisfied (NO in step S203). The advance notification information is information that notifies a user that a maintenance time of the vehicle 70 registered in the maintenance application is coming closer. FIG. 6 illustrates a first push notification 314 that is outputted to the display 21 as an example of the advance notification information. It is to be noted that a push notification including the first push notification 314 is displayed on the display 21 of the portable device 20 by a user setting the permission of the push function in the portable device 20 in advance as described above even in case that the maintenance application is not on.

Figure 7:
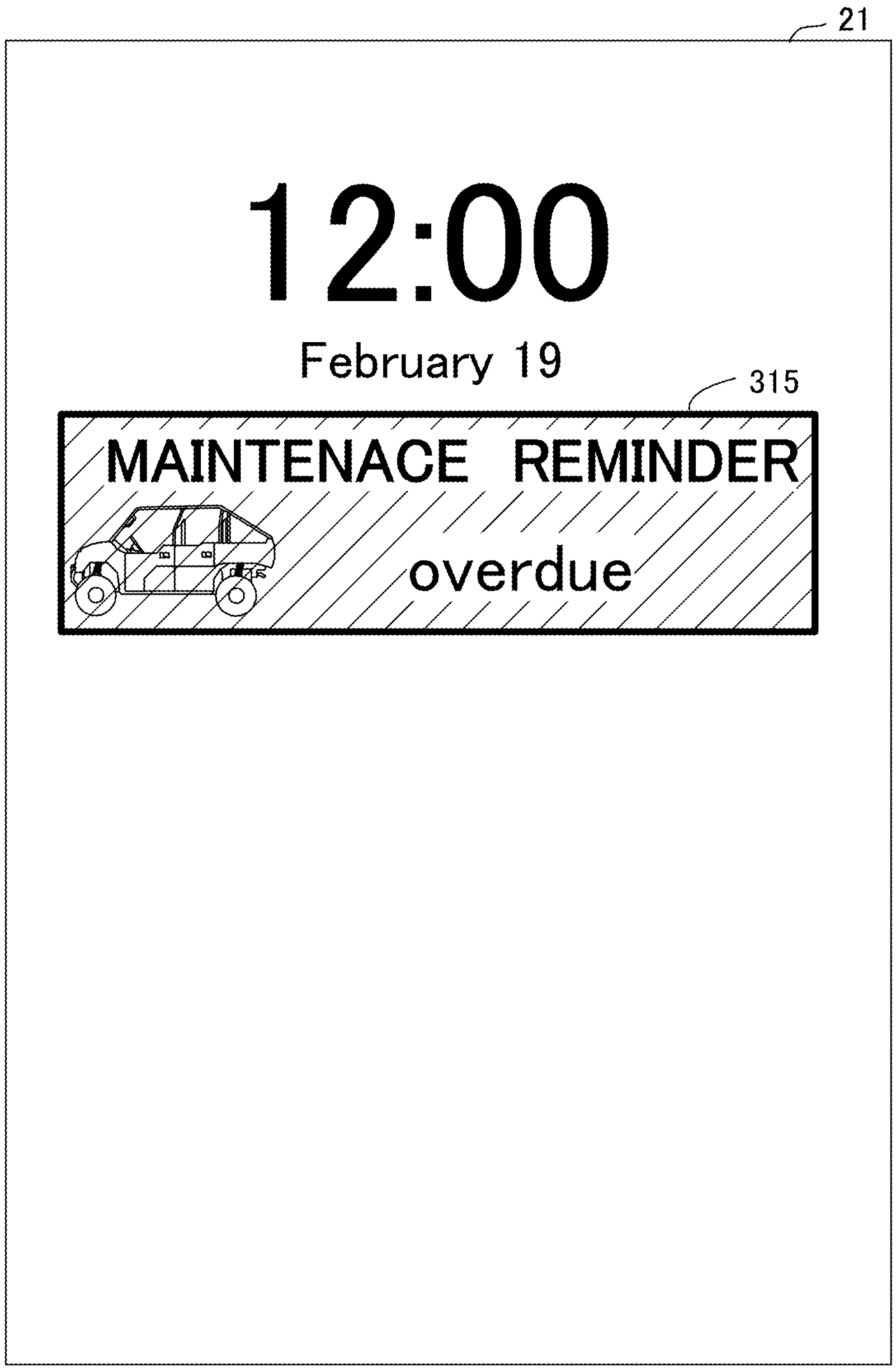
FIG. 7 is a diagram illustrating an example of maintenance notification information outputted to the display of the portable device.

In contrast, in case that at least one of (i) or (ii) above is satisfied, the second controller 51 makes an affirmative determination for step S203 and advances the processing to step S207. In step S207, the second controller 51 outputs maintenance notification information to the display 21. The maintenance notification information is information that is outputted to the notification device of the portable device 20 in case that the maintenance notification condition is satisfied (YES in step S203). The output aspect of the maintenance notification information is different from that of the advance notification information. The maintenance notification information is information that notifies a user that a maintenance time of the vehicle 70 registered in the maintenance application has already arrived. The maintenance notification information is configured in an emphasized display aspect as compared with that of the advance notification information. Specifically, FIG. 7 illustrates a second push notification 315 that is outputted to the display 21 as an example of the maintenance notification information. As illustrated in FIGS. 6 and 7, the character size, the color, or the like of the second push notification 315 is emphasized more than that of the first push notification 314. In another embodiment, the second controller 51 may output sound related to the advance notification information or the maintenance notification information with sound by the speaker 22 or vibration by a vibrator instead of or in addition to outputting the first push notification 314 or the second push notification 315 to the display 21. In addition, the second controller 51 may issue a notification of each piece of notification information at a timing when the second controller 51 determines that the portable device 20 is operated after driving of the vehicle 70 (drive state) is terminated. This causes a notification of each piece of notification information to be issued at a timing at which a driver does not have to pay attention to driving the vehicle 70. It is thus possible to make the user more conscious of the notification information.

Upon executing the notification determination processing illustrated in FIG. 5, the second controller 51 advances the notification processing in FIG. 4 to step S210 and generates a driving log by using the acquired driving information. The driving log is a history regarding the driving state of the vehicle 70 from turning on the engine 74 of the vehicle 70 to turning off the engine 74 of the vehicle 70. In the present embodiment, the portable device 20 includes a sensor such as a GPS that measures a self-position. In addition, the second memory 60 of the portable device 20 stores map information. The second controller 51 uses the self-position, the map information stored in the second memory 60, and the driving information acquired from the vehicle 70 to generate, as a driving log, a movement trajectory of the vehicle 70, and the driving time and the driving distance from starting to acquire the driving information about the vehicle 70. In addition, the second controller 51 serially stores the generated driving log in the second memory 60. It is to be noted that the self-position with which a movement trajectory is generated does not have to be the self-position of the portable device 20. The second controller 51 may acquire the self-position of the vehicle 70 from the vehicle 70 along with the driving information and generate a driving log by using the self-position of the vehicle 70.

Figure 8:
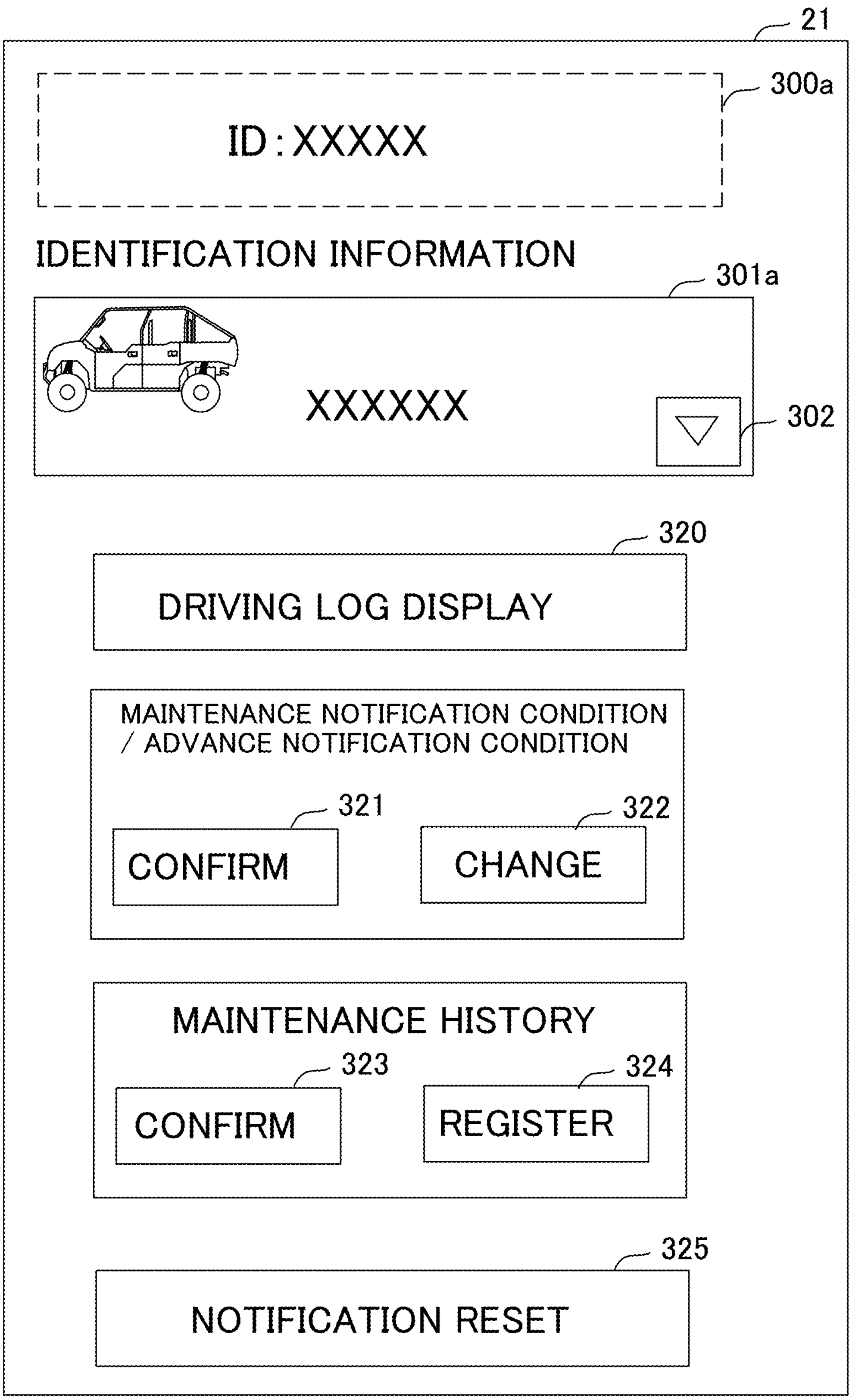
FIG. 8 is a diagram illustrating an example of an operation screen of a maintenance application.
Figure 9:
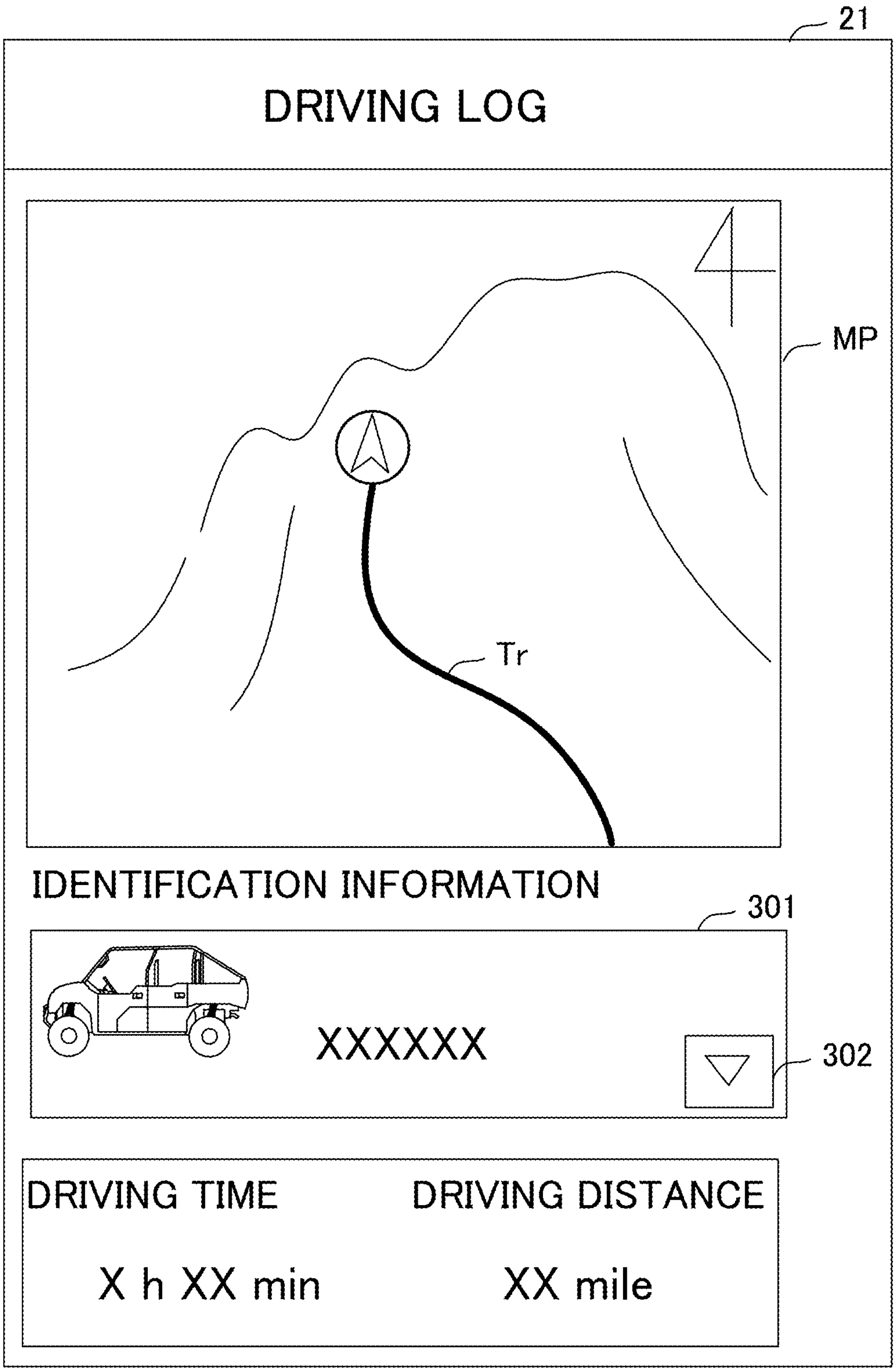
FIG. 9 is a diagram illustrating an example of a driving log that is outputted to the portable device.

FIG. 8 is a diagram illustrating an example of an operation screen of the maintenance application that is displayed on the display 21. In FIG. 8, a user ID 300*a*, identification information 301*a* of the vehicle 70, and various operation buttons including a driving log display button 320 are outputted. The second controller 51 outputs the operation screen exemplified in FIG. 8 to the display 21 in case that the maintenance application is started after the initial setting processing ends. The second controller 51 outputs a driving log to the display 21 in case that the driving log display button 320 receives an on operation. FIG. 9 is a diagram illustrating an example of a driving log that is outputted to the display 21. In FIG. 9, a map MP obtained by superimposing a movement trajectory Tr of the vehicle 70 on map information, and the driving time and the driving distance from turning on the engine 74 of the vehicle 70 are outputted as a driving log.

FIG. 8 further illustrates a confirm button 321 of a maintenance notification condition and an advance notification condition, a change button 322 of these conditions, a confirm button 323 of a maintenance history, a register button 324 of the maintenance history, and a notification reset button 325. In case that the confirm button 321 of a maintenance notification condition and an advance notification condition receives an on operation, the second controller 51 outputs the current maintenance notification condition and advance notification condition to the display 21. In addition, in case that the change button 322 of the conditions receives an on operation, the second controller 51 outputs, to the display 21, an operation screen that receives a change from the current maintenance notification condition and advance notification condition. In case that at least one of the maintenance notification condition or the advance notification condition is changed, the second controller 51 executes again the notification determination processing in step S200 by using the changed condition. The confirm button 323 and the register button 324 of a maintenance history and the notification reset button 325 will be described below.

FIG. 4 will be referred to again. Once a driving log is generated in step S210, the second controller 51 returns the notification processing to step S100. In case that communication with the vehicle 70 is established (YES in step S100), that is, while the supply of power to the first controller 105 is retained, the second controller 51 repeats the acquirement of driving information (step S102), the execution of the notification determination processing (step S200), and the generation of a driving log (step S210) at predetermined intervals. In case that communication with the vehicle 70 is interrupted (NO in step S100), that is, in case that the supply of power to the first controller 105 is interrupted, the second controller 51 ends the notification processing. It is to be noted that the second controller 51 may transmit the account and the identification information set in the initial setting processing, the maintenance notification condition, the advance notification condition, the driving information acquired in the notification processing, the driving log generated in the notification processing, and the like to the server 200 in case that communication with the server 200 is established.

The following describes post-notification processing that is executed subsequently to the notification processing after the second controller 51 outputs the advance notification information or the maintenance notification information in the notification processing.

Figure 10:
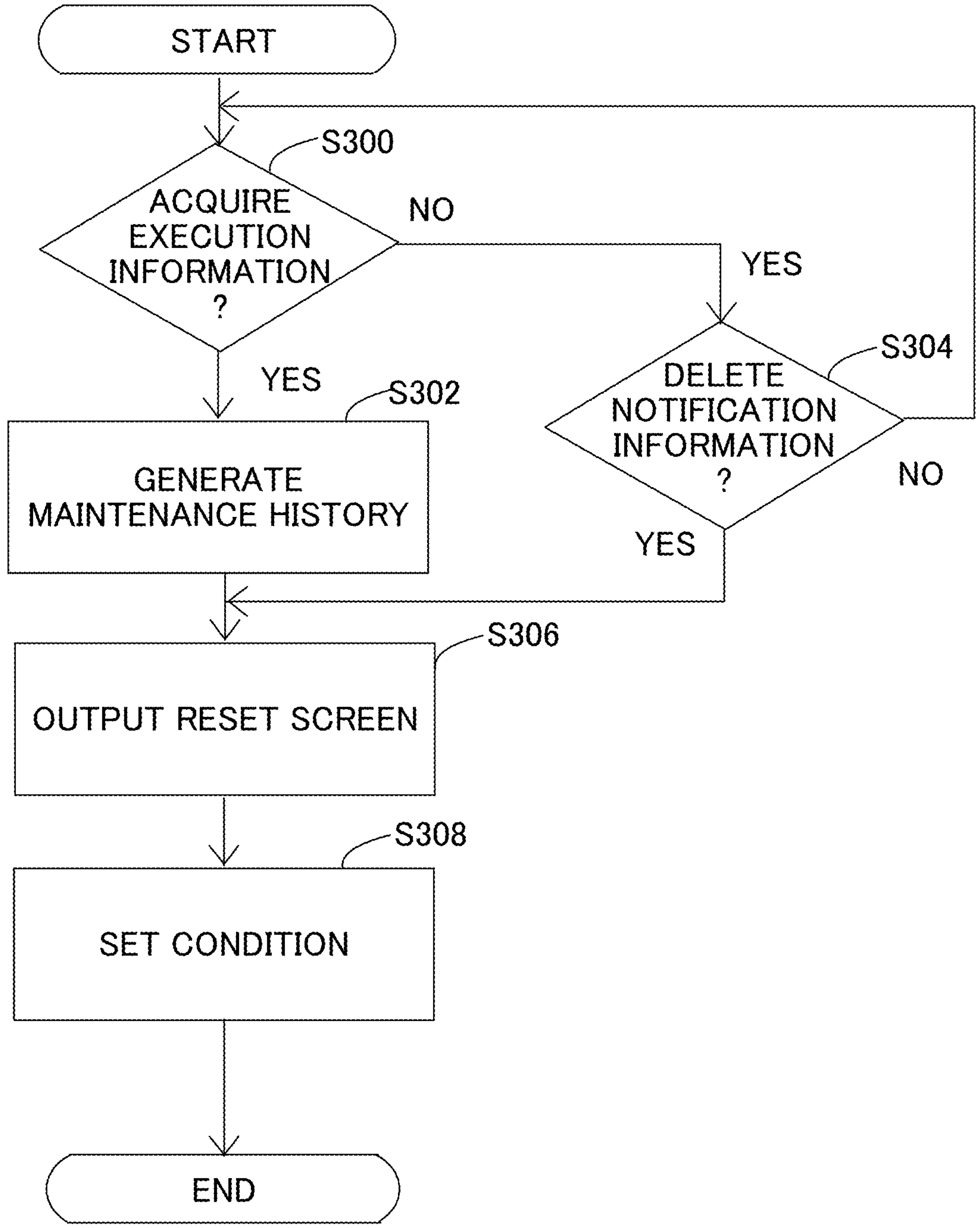
FIG. 10 is a diagram illustrating a flow of post-notification processing that is executed after notification information is outputted.

FIG. 10 illustrates a flow of the post-notification processing. The second controller 51 determines in step S300 whether or not execution information is acquired. The execution information is information regarding the execution of maintenance. In the present embodiment, the second controller 51 makes an affirmative determination for step S300 in case that the information regarding the execution of maintenance is inputted through the display 21 of the portable device 20.

Figure 11:
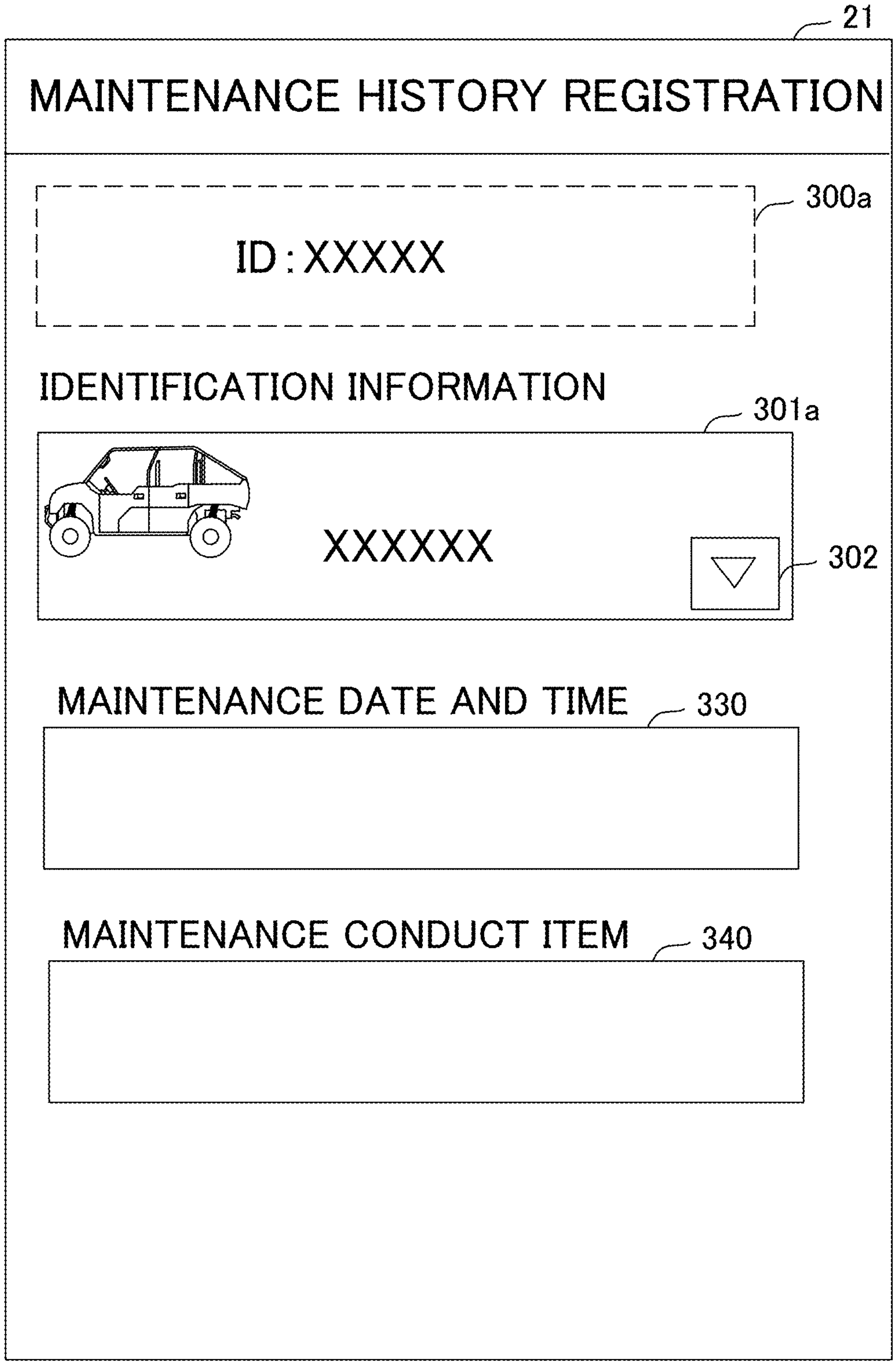
FIG. 11 is a diagram illustrating an example of an operation screen in which contents of maintenance are registered.

FIG. 11 is a diagram illustrating an operation screen that is an example of an operation screen of the maintenance application displayed on the display 21. In the operation screen, the contents of maintenance are registered. The second controller 51 outputs the operation screen illustrated in FIG. 11 in case that the register button 324 of a maintenance history illustrated in FIG. 8 is turned on. The operation screen illustrated in FIG. 11 indicates the user ID 300*a*, the identification information 301*a* about the vehicle 70, an input region 330 of a maintenance date and time, and an input region 340 of a maintenance conduct item. The second controller 51 prompts a maintenance date and time or a maintenance conduct item to be inputted, for example, by displaying a cursor in the input region 330 or 340. In case that at least one of the maintenance date and time or the maintenance conduct item is inputted, the second controller 51 makes an affirmative determination for step S300 and resets the count time and the count distance.

The second controller 51 generates a maintenance history in step S302 by using the information acquired in step S300. The maintenance history is a history regarding a maintenance conduct date and time and a maintenance conduct item of the vehicle 70 up to now. The second controller 51 adds the information acquired in step S300 to maintenance history data generated in the past and generates the newest maintenance history. It is to be noted that the second controller 51 may transmit the generated maintenance history to the server 200 in case that communication with the server 200 is established.

Figure 12:
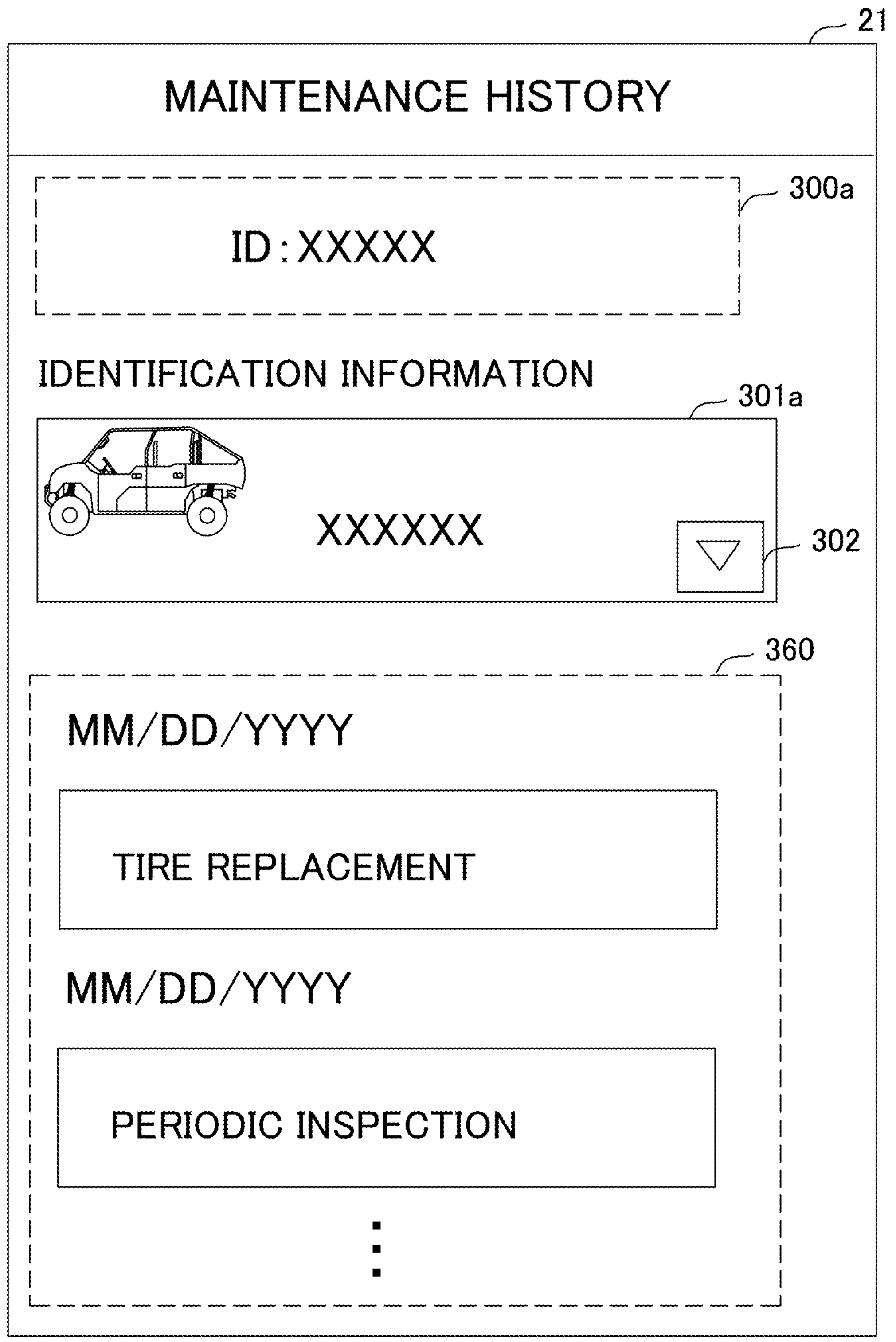
FIG. 12 is a diagram illustrating an example of a maintenance history that is outputted to the portable device.

FIG. 12 is an example of a maintenance history that is outputted to the display 21. For example, in case that the confirm button 323 (FIG. 8) of a maintenance history is turned on, the second controller 51 outputs the maintenance history generated in step S302 to the display 21. FIG. 12 illustrates the user ID 300*a*, the identification information 301*a* about the vehicle 70, and a correspondence relationship 360 between a maintenance conduct date and time and a maintenance conduct item. It is possible for a user to grasp a maintenance date and time and a maintenance item up to now by swiping, for example, on the region in which the correspondence relationship 360 is indicated.

FIG. 10 will be referred to again. In case that the second controller 51 does not acquire the execution information (NO in step S300), the second controller 51 determines in step S304 whether or not an operation of deleting the advance notification information or the maintenance notification information is performed. For example, in case that an operation of deleting the first push notification 314 or the second push notification 315 illustrated in FIG. 6 or 7 is performed or in case that the notification reset button 325 receives an on operation on the operation screen illustrated in FIG. 8, the second controller 51 makes an affirmative determination for step S304 and resets the count time and the count distance. In case that the deleting operation is not executed (NO in step S304), the second controller 51 returns the post-notification processing to step S300. In this case, the second controller 51 continues outputting the advance notification information or the maintenance notification information until an affirmative determination is made for step S300 or step S304.

In step S306, the second controller 51 outputs a reset screen of a maintenance notification condition and an advance notification condition. The reset screen is a screen including the input region 305 of a maintenance notification condition and the input region 306 of an advance notification condition outputted to the display 21 by the second controller 51 in the initial setting processing. The second controller 51 outputs the reset screen to prompt a user to input a maintenance notification condition and an advance notification condition regarding the next maintenance. It is to be noted that the second controller 51 may output by default the maintenance notification condition and the advance notification condition set the last time.

Once the maintenance notification condition and the advance notification condition are reset, the second controller 51 stores the reset maintenance notification condition and advance notification condition in the second memory 60 and executes again the notification processing described in FIGS. 4 and 5 in step S308.

According to the embodiment described above, in case that the driving information acquired by the portable device 20 from the vehicle 70 satisfies a notification condition, the notification device of the portable device 20 outputs notification information regarding maintenance. There are many opportunities for the portable device 20 to approach the vehicle 70 along with a user who gets in the vehicle 70. Thus, there are more opportunities for the portable device 20 to acquire the driving information from the vehicle 70 than a fixed device that is installed at a position apart from the vehicle 70. This makes it possible to increase the update frequency of the driving information and issue a notification of maintenance at an appropriate timing.

Further, the portable device 20 is carried by a user in many cases even when apart from the vehicle 70. This allows the user to quickly grasp the information regarding maintenance after driving the vehicle 70 in case that the portable device 20 issues a notification of the information regarding maintenance. This also makes it possible to issue a notification of maintenance at an appropriate timing. For example, in case that a driver is carrying the portable device 20, the driver confirms the notification with the portable device 20 after driving. The driver does not have to pay attention to a driving operation after the driving. This allows the driver to grasp the contents of the notification more than confirming the contents of the notification while driving.

In addition, the driving information acquired from the vehicle 70 by the portable device 20 communicating with the vehicle 70 includes driving integrated values that increase along with the driving of the vehicle 70. Specifically, the driving information includes driving time and driving distance. It is highly related to the condition of the vehicle 70 whether the driving integrated values are large or small. Specifically, as the driving integrated values increase, the vehicle needs maintenance more. In the present embodiment, a maintenance notification condition and an advance notification condition are determined on the basis of the driving time and the driving distance. It is thus possible for a user to acquire notification information at a timing appropriate for the maintenance of the vehicle 70.

In addition, in the present embodiment, a notification condition is set on the basis of the driving information about the vehicle 70. A notification of notification information such as advance notification information or maintenance notification information is thus issued in accordance with the use frequency of the vehicle 70. This makes it possible to issue a notification of the information regarding maintenance at a more appropriate timing than a timing in case that a notification condition is set on the basis of a date and time.

In addition, it is possible for a user to input a maintenance notification condition and an advance notification condition through the input device of the portable device 20. This allows the user to set a desired maintenance notification condition and advance notification condition. According to the present embodiment, it is thus possible to output notification information that is very convenient for the user. For example, a maintenance notification condition and an advance notification condition desired by a user are set. This makes it easier to set the frequency of maintenance in accordance with a preference and a request of the user. It is possible to notify each user of the information regarding maintenance.

In addition, the second controller 51 outputs notification information on the basis of an advance notification condition before a maintenance notification condition is satisfied. This allows a user to grasp the arrival of the maintenance notification in advance and execute maintenance with margin time.

In addition, the second controller 51 outputs advance notification information through the notification device of the portable device 20 in the period from the satisfaction of an advance notification condition satisfaction to the of a maintenance notification condition. After the maintenance notification condition is satisfied, the second controller 51 outputs maintenance notification information through the notification device of the portable device 20. The aspects of the advance notification information and the maintenance notification information are different. This allows a user to recognize a difference between the pieces of notification information and allows the user to grasp the emergency degree of maintenance more easily.

In addition, the second controller 51 stops outputting notification information in response to an input (output stop operation) to the input device by a user. This makes it possible to suppress a notification continuing even after a user confirms that the maintenance of the vehicle 70 is completed or that the maintenance of the vehicle 70 is unnecessary. It is to be noted the second controller 51 may execute the notification processing to periodically repeat a notification in case that the notification is not stopped, that is, no output stop operation is performed. This makes it possible to prevent outputting the notification information from being stopped with a stop of a notification not confirmed. It is thus possible to increase an effect of reminding a user.

Further, in case that the second controller 51 stops outputting the notification information by a user making an input to the input device, the second controller 51 outputs information that prompts the notification condition to be reset. This offers an advantage that a notification regarding maintenance is easily achieved at a timing of maintenance which newly arrives after the user performs an output stop operation.

In addition, the second controller 51 changes the notification condition by a user making an input to the input device even after the initial setting processing. This allows the user to reset the notification timing in response to a change in a situation including the usage situation of the vehicle 70. In this way, according to the present embodiment, there is provided an opportunity to reset the notification condition. This makes it possible to achieve a notification regarding maintenance at a timing desired by a user.

In addition, according to the present embodiment, each time communication between the first communication portion 71 and the second communication portion 30 is enabled, the driving information is outputted to the portable device 20. It is thus possible to transmit the driving information to the portable device 20 more frequently. In addition, outputting the driving information to the portable device 20 at least once in one round (one trip) of the vehicle 70 from a traveling start to a traveling end makes it possible to transmit the driving information more frequently. It is to be noted that the driving information may be outputted to the portable device 20 a plurality of times while the vehicle 70 is traveling.

According to the present embodiment, a push notification causes a notification to be displayed. Even when a user does not display a screen regarding the maintenance application on the display 21, it is possible for the user to grasp information (advance notification information or maintenance notification information) regarding a maintenance time. In addition, it is possible to grasp the information regarding maintenance after the vehicle 70 is driven. Missing the maintenance time is thus suppressed.

In addition, in the present embodiment, the first communication portion 71 is configured to be capable of performing contactless wireless communication with the portable device 20 carried by a user positioned in the riding space of the vehicle 70. For example, the first communication portion 71 is configured to be capable of wirelessly communicating with the portable device 20 carried by a driver sitting on a seat in the vehicle 70. This allows the portable device 20 to achieve the transmission and reception of signals to and from the vehicle 70 whenever the driver drives. This makes it possible to transmit and receive signals more frequently. In addition, a person who carries the portable device 20 does not have to perform a special operation to transmit and receive signals. It is thus possible to increase the operability regarding a notification. It is to be noted that, for example, the communicable range of the second communication portion 30 and the first communication portion 71 is desirably set to distance which enables communication with the first communication portion 71 when a user puts the portable device 20 in a pocket, a bag, or the like. For example, it is desirable that the communicable distance be distance which enables communication even one m or more apart from the position of the first communication portion 71. This allows a user to achieve communication without having to take out the portable device 20 and it is possible to increase convenience. It is to be noted that the portable device 20 may be communicable by a user taking out the found portable device 20 and moving the portable device 20 to a predetermined position set in the vehicle 70. Additionally, the portable device 20 may communicate with the first communication portion 71 through wired communication.

In addition, in the present embodiment, the driving information is stored in a nonvolatile memory. Specifically, a driving integrated value is stored in the nonvolatile memory. Information about the driving integrated value is not thus deleted even in case that the supply of power to the first control device 100 is interrupted. In addition, the driving information keeps stored in the first memory 110 of the vehicle 70 as an integrated value. Even when the vehicle 70 is driven with no driving information exchanged, it is thus possible to acquire driving information without fail and issue a notification of a maintenance time with high precision by a user getting in the vehicle with the portable device 20 at the next opportunity.

It is to be noted that a utility vehicle is exemplified in the present embodiment as a vehicle included in the notification system 10, but it is preferable that the vehicle included in the notification system 10 be an off-roading wheeled vehicle. The off-roading frequency, the condition of a rough road to be traveled, and the driving state of the off-road wheeled vehicle vary with the off-roading wheeled vehicle in accordance with the usage of each user. This considerably varies a maintenance notification time in accordance with whether the driving integrated value is large or small. The application of the notification system described above to such an off-roading wheeled vehicle makes it easier to make a notification timing appropriate for each user. The off-roading wheeled vehicle includes a riding lawn mower, an agricultural wheeled vehicle or a constructional wheeled vehicle, or the like in addition to the utility vehicle. For example, an off-road driving wheeled vehicle included in the notification system 10 includes ROPS (Roll-Over Protective Structures) 783 (see FIG. 13). The ROPS is structure that secure an occupant space even in case that the vehicle travels in an uneven area and rolls over. For example, pipe members are disposed outside the occupant space in the width direction and above the occupant space.

Figure 13:
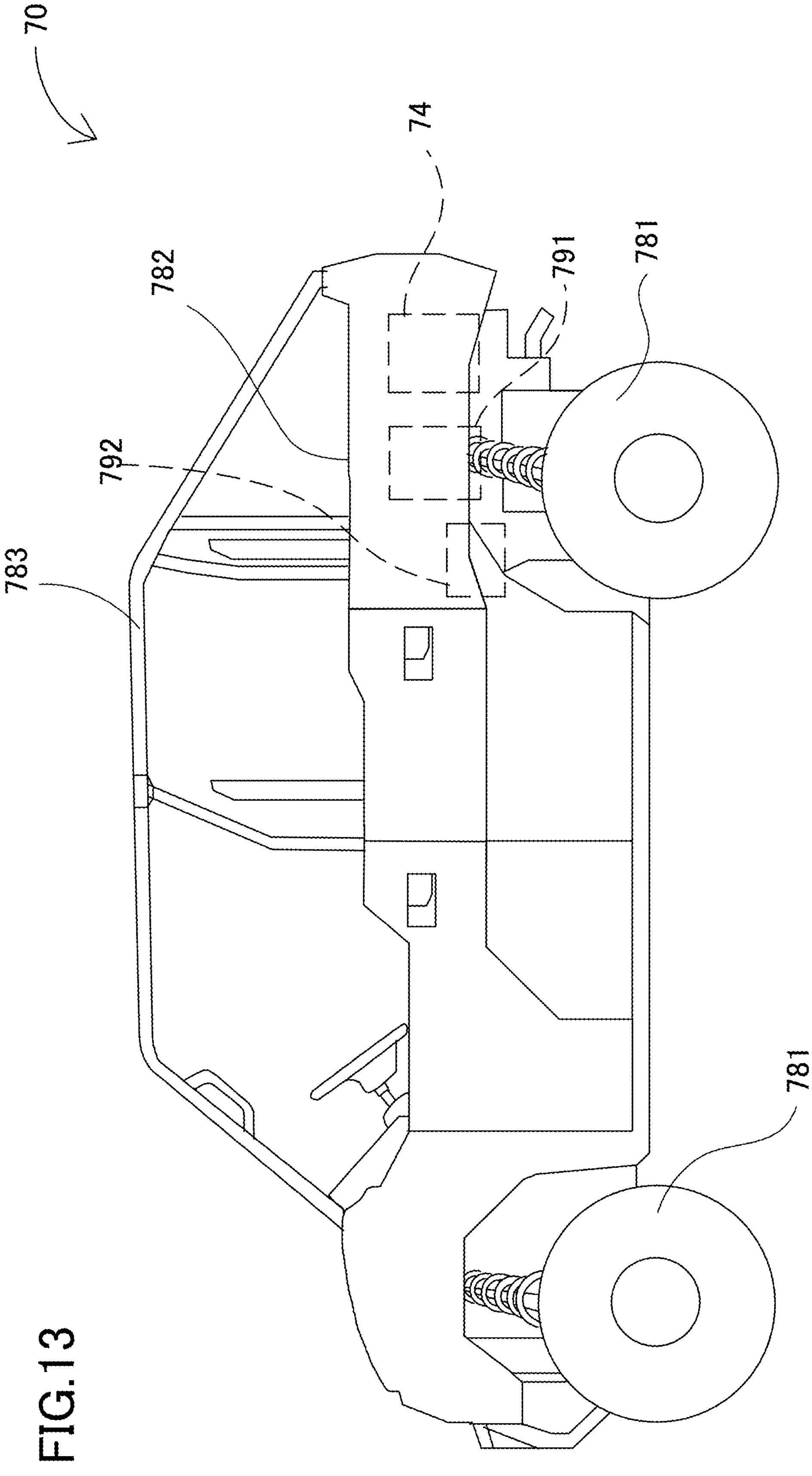
FIG. 13 is a diagram illustrating a utility vehicle serving as an example of a vehicle.

In case that the vehicle included in the notification system 10 is an off-road driving wheeled vehicle, the wheeled vehicle is preferably configured to be capable of traveling with four-wheel drive. In addition, the wheeled vehicle is preferably configured to be capable of switching traveling modes between four-wheel drive and two-wheel drive. Four-wheel drive makes it possible to impart, even when any of the front and rear wheels slips, driving forces to the wheels that are not slipping. This makes it possible to increase the roadability with respect to rough roads. In addition, the off-road driving wheeled vehicle includes a differential gear. The differential gear has a differential function, that is, applies driving forces to left and right wheels or front and rear wheels in accordance with the loads on the wheels with the driving forces different therebetween. In addition, it is preferable that the off-road driving wheeled vehicle include a differential lock function of stopping the differential function described above. This makes it possible to impart, even when any of left and right wheels or front and rear wheels slips due to the irregularities of the surface of a traveled road, driving forces to the wheels that are not slipping. This makes it possible to increase the roadability with respect to rough roads. The differential lock function may be provided to the front left and right wheels, the rear left and right wheels, and any of the front and rear wheels. FIG. 13 exemplifies a four-wheel drive mechanism 791 that allows for traveling with four-wheel drive and a differential/differential lock switching mechanism (first mechanism) 792 serving as a switching mechanism that performs a differential function and stops the differential function. FIG. 13 is a diagram describing that the vehicle 70 may include the four-wheel drive mechanism 791 and the differential/differential lock switching mechanism 792. The disposition of the respective mechanisms 791 and 792 is not limited to FIG. 13.

It is to be noted that the notification system 10 according to the present disclosure and the notification method including the initial setting processing, the notification processing, the determination processing, and the post-notification processing are not limited to the embodiment. For example, at least one of other non-limiting embodiments described below may be adopted in combination with the notification system 10 exemplified in the embodiment, the notification method including the initial setting processing, the notification processing, the determination processing, and the post-notification processing, and at least one of the features described in the respective claims.

Another Embodiment 1

In case that the first push notification 314 or the second push notification 315 (FIG. 6 or 7) is held down, the second controller 51 may output the operation screen of the maintenance application illustrated in FIG. 8 to the display 21. The information related to maintenance may be further displayed on the operation screen. For example, a URL link serving as information that helps order a maintenance item (part) of the vehicle 70, information about a maintenance company or a maintenance plant that executes the maintenance of the vehicle 70, or a link to a reservation form serving as information that helps make a reservation for maintenance in the maintenance company or the maintenance plant may be displayed. In addition, the advance notification information and the maintenance notification information are not limited to the push notifications 314 and 315 described above. The portable device 20 may be notified of the advance notification information and the maintenance notification information by e-mail. Alternatively, the advance notification information and the maintenance notification information may be displayed on an operation screen of the maintenance application.

In this form, it is preferable that the portable device 20 transmit not only the driving information, but also other information to the server 200. For example, the portable device 20 may transmit at least any of the identification information about a vehicle for which the driving information is acquired, a user ID, information indicating an attribute of a user, information indicating an attribute of the vehicle, or a driving log along with the driving information. The information indicating an attribute of a user may include the sex of the user, the age, the residential area, the sales company of the vehicle, a repair shop of the vehicle, and the like. The information indicating an attribute of the vehicle may include the type of the vehicle, the maintenance history, and the like. This makes it possible to gather and classify driving information for each attribute of a user or each attribute of a vehicle. This may cause the server 200 to transmit a result of the estimation of a maintenance time to the portable device 20 by extracting pieces of information including similar attributes from a database.

In addition, in case that a user gives permission, the portable device 20 or the server 200 may transmit the notification information regarding maintenance to a person who is relevant to the maintenance on the basis of user information. For example, the notification information regarding maintenance may be transmitted to a server in a management company of the vehicle, a maintenance company of the vehicle, a company that supplies a part necessary for maintenance, the sales company of the vehicle, or the manufacturing company of the vehicle. In addition, advance registration by a user may cause a notification of notification information to be issued for a portable device of another user to whom it is desirable to transmit a notification of maintenance. This allows the maintenance information to be shared. This makes it possible to reduce pieces of information that are provided by the user to a person who is relevant when maintenance is started.

Another Embodiment 2

The second controller 51 may estimate the driving time and the driving distance of the vehicle 70 in one trip that are associated with an account (user ID) by using a driving log stored in the second memory 60. In case that it is possible to estimate that the driving time or the driving distance is to satisfy an advance notification condition or a maintenance notification condition in the next trip by using the estimated driving time and the estimated driving distance, the second controller 51 may issue a notification indicating that a maintenance time can possibly come closer in the next trip or that a maintenance time can possibly arrive in the next trip after the notification processing (FIGS. 4 and 5) ends. According to this form, the convenience for a user further increases.

Another Embodiment 3

The notification conditions are not limited to the conditions described in the embodiment. For example, a maintenance notification condition may include the arrival of a date and time (timing) set by a user. In this case, an advance notification condition may be a date and time closer to the starting time than the set date and time.

In addition, the second controller 51 may be configured to correct a notification condition in relation to a default value or a value inputted by a user in accordance with the driving information acquired from the vehicle 70. The corrected value may be a value that makes a notification arrive earlier in accordance with the time elapsed from manufacturing the vehicle 70. In addition, the second controller 51 may correct the notification condition to delay the arrival of the notification if the information acquired from the vehicle 70 is information indicating a driving operation or a traveling state that suppresses the arrival of maintenance. In this way, the second controller 51 may correct the maintenance notification time on the basis of the cause-effect relationship with maintenance in accordance with the traveling state of the vehicle 70, the state of the engine that is a propulsion source, and the operation state of a driver.

Another Embodiment 4

The execution information acquired by the second controller 51 in step S300 (FIG. 10) of the post-notification processing is not limited to the date and time of the execution of maintenance and a maintenance conduct item and may be other information regarding the execution of maintenance. For example, the second controller 51 may output an input region of a maintenance place, an image of a maintained part, or the like to the display 21. In case that the maintenance place or the image is inputted, the second controller 51 may determine that the execution information is acquired. In addition, the maintenance history may include at least one of the maintenance place, the image of the part, or the count time and the count distance from the starting time to the conduct of maintenance in addition to the execution date and time of maintenance and the maintenance conduct item.

In addition, in case that a part for which maintenance is to be prompted is clear from a result of the detection of a sensor value, the second controller 51 may determine that the notification condition is satisfied regardless of the driving integrated value. For example, in case that engine intake pressure deviates from a predetermined range, the portable device 20 may issue a notification of a request to replace an air cleaner element. Alternatively, in case that the pressure of engine oil deviates from a predetermined range, the portable device 20 may issue a notification of a request to replace an oil filter.

Another Embodiment 5

It is sufficient if the driving integrated value is a value that increases along with the driving of the vehicle. The driving integrated value does not have to be total driving distance and total driving time. For example, the driving integrated value may be the total traveling time for which the vehicle is traveling instead of the total driving time for which the propulsion source is driven. In this case, the total traveling time does not include the time for which the engine is in an idling state and the vehicle stops traveling. Alternatively, the driving integrated value may be the total number of rotations of an output shaft of the propulsion source or the total number of revolutions of a rotor that revolves along with the rotations of the output shaft, the total output of the propulsion source, the total amount of consumed fuel or the total amount of consumed power, the total number of times the brake is stepped on, the total number of skids, the total number of times the engine stalls, or the like from manufacturing the vehicle to detecting the newest value by the detection portion 72. In addition, the driving integrated value may be the integrated value of impact forces or loads applied to the vehicle body due to jumps, collisions with obstacles, or the like, the integrated value of the total amount of stroke movements of the suspension or the number of vibrations. The traveling speed, the engine speed, or the like may be divided into a plurality of ranges and the driving integrated value may be obtained for each of the ranges. For example, a threshold that satisfies a notification condition may be set lower for an integrated value obtained for the high speed range than that of an integrated value obtained for the low speed range.

It is to be noted that the engine ECU 73 of the vehicle 70 sometimes acquires a result of detection by the detection portion 72 and outputs warning information indicating an abnormality regarding the vehicle 70 including the engine 74 or a wiring line or an electronic part such as a sensor or an actuator. In this case, the first controller 105 may transmit an error code that is a type of warning to the portable device 20 as the driving information. The second controller 51 of the portable device 20 may notify a user of an abnormal condition by using the notification device. Further, information that describes the details of the abnormal condition which means warning may be displayed along with the notification in accordance with the type of warning. This allows the user to grasp the specific contents of the warning and the emergency degree of repair or maintenance. It is to be noted that, in case that the second controller 51 receives an error code, the second controller 51 may transmit a request signal including the identification information about the vehicle 70 and the error code to the server 200. The third controller 213 of the server 200 may transmit, to the portable device 20, information about the cause of the error occurring in the vehicle 70 or a part for which maintenance is recommended with reference to the correspondence relationship between an error code stored in the third memory 220 in advance and the cause of the generation of the error. In case that the second controller 51 of the portable device 20 receives information corresponding to the error code from the server 200, the second controller 51 may output, to the display 21, the information regarding the cause of the abnormality regarding the vehicle 70 or the part for which maintenance is recommended regardless of whether or not a maintenance notification condition or an advance notification condition is satisfied. It is possible to prevent the portable device 20 from running out of memory capacity by acquiring the information from the server 200.

Another Embodiment 6

It is sufficient if the driving information that is transmitted by the first communication portion 71 is driving information related to a notification of the vehicle 70. The driving information that is transmitted by the first communication portion 71 may be information other than the information with which a notification of maintenance is issued described above. For example, the driving information may be information regarding the driving of the propulsion source or information regarding the driving of the vehicle 70 other than the propulsion source. For example, it is possible for the portable device 20 to allow a user to grasp the driving state of the vehicle 70 by displaying the total traveling time or the total traveled distance transmitted from the second communication portion 30 separately from a notification of maintenance. For example, it is easier for the user to manage the vehicle 70 by quickly grasping notification information such as the total traveled distance or the total traveling time. In this way, information regarding maintenance is preferable as the notification information, but the notification information may be used to issue a notification other than a notification of maintenance.

Another Embodiment 7

In the other embodiment 5, the second controller 51 may acquire, from the vehicle 70, the driving information including driving time, driving distance, results of detection by various sensors included in the detection portion 72, and the like in a predetermined period of time before an error code is outputted. Further, the second controller 51 may transmit the driving information to the server 200. The third controller 213 of the server 200 may acquire error codes and pieces of driving information in a predetermined time for learning from the plurality of portable devices 20 connected to the server 200 through the Internet and estimate time in which error codes are outputted in response to the inputted pieces of driving information by using a result of learning. In this case, the third controller 213 may communicate with the portable device 20 in the notification processing and estimate time in which an abnormality can possibly occur in the vehicle 70 by using the pieces of driving information. The third controller 213 may transmit information about the estimated time and a part in which an abnormality can possibly occur to the portable device 20. The second controller 51 of the portable device 20 may output the acquired information about the estimated time and the part to the display 21. According to this form, it is possible for a user to obtain information about a part or the like to be maintained before an abnormality occurs. This further increases the convenience for the user.

Another Embodiment 8

In the embodiment, the driving information that is acquired by the portable device 20 from the vehicle 70 through communication may be one of driving time or driving distance. In addition, the driving information may be other information that allows the driving state of the vehicle 70 to be grasped. For example, the driving information may be a result of detection by an accelerator position sensor, a brake position sensor, an acceleration sensor, or a speed sensor. The first controller 105 or the second controller 51 may estimate that short distance is repeatedly traveled, a slope is traveled, or a rough road is traveled by using the result of detection by each of the sensors. In this case, a maintenance notification condition or an advance notification condition may be, for example, that short distance is repeatedly traveled, a slope is traveled, or a rough road is traveled a predetermined number of times. According to this form, it is possible to set a maintenance notification condition or an advance notification condition corresponding to the characteristics of the vehicle 70.

Another Embodiment 9

In case that a maintenance notification condition or an advance notification condition is fixed at a default value in advance, a selection operation by a user may be omitted. In addition, the difference or the proportion between the current integrated value, and a notification or a threshold of the notification may be expressed as a character or a diagram. This offers an advantage that it is possible for a user to easily grasp the period of a notification of maintenance notification information or advance notification information. In addition, any one of time or distance in a notification condition does not have to be described (inputted) and may be blank.

Another Embodiment 10

In the embodiment, in case that (iii) the count time reaching the advance notification time and (iv) the count distance reaching the advance notification distance are both satisfied in the determination about the advance notification condition described in step S201 in FIG. 5, the second controller 51 may make an affirmative determination for step S201. Similarly, in case that (i) the count time reaching the maintenance notification time and (ii) the count distance reaching the maintenance notification distance are both satisfied in step S203 in FIG. 5, the second controller 51 may make an affirmative determination for step S203. According to this form, it is possible to satisfy the needs of a user who wishes to execute maintenance by taking into consideration both the driving time and the driving distance. It is to be noted that the second controller 51 may be configured to cause a user to select, for example, the satisfaction of at least one of (i) or (ii) above or the satisfaction of both (i) and (ii) as an output condition of notification information.

Another Embodiment 11

In the embodiment, the second controller 51 acquires an advance notification condition and a maintenance notification condition through the input device. In case that the advance notification condition is satisfied or in case that the maintenance notification condition is satisfied, the second controller 51 outputs notification information. In contrast, the second controller 51 may be configured to output the notification information (maintenance notification information) by using only the maintenance notification condition. Even in this form, in case that the maintenance notification condition is satisfied, the maintenance notification information is outputted to the portable device 20. It is thus possible for a user to grasp the arrival of a maintenance time. Alternatively, the second controller 51 may be configured to output the notification information (advance notification information) by using only the advance notification condition. Even in this form, in case that the advance notification condition is satisfied, the advance notification information is outputted to the portable device 20. It is thus possible for a user to quickly grasp that a maintenance time is coming closer.

Another Embodiment 12

In the embodiment, at least part of the processing executed by the second controller 51 of the portable device 20 may be executed by the third controller 213 of the server 200. At least part of the processing executed by the third controller 213 may be executed by the second controller 51.

Another Embodiment 13

In the initial setting processing (FIG. 2), the notification processing (FIG. 4), the notification determination processing (FIG. 5), and the post-notification processing (FIG. 10) in the embodiment, the order of the respective steps may be changed as appropriate or any of the respective steps may be executed at the same time.

Another Embodiment 14

The vehicle 70 included in the notification system 10 is not limited to a wheeled vehicle that travels in an uneven area. A wheeled vehicle that travels in a public road or an even area may be used. Specifically, a four-wheeled automobile, a motorbike, a golf cart, or a PTV may be used.

In addition, the vehicle 70 included in the notification system 10 is not limited to a utility vehicle (UV) and may be a craft such as a personal watercraft (PWC) or a motorcycle (MC). In case that the vehicle 70 is a PWC, examples of maintenance items include engine oil, an oil filter, handle bar pivot lubrication, joint lubrication, a spark plug, and a periodic inspection.

In addition, it is possible to exemplify an internal combustion engine or an electric motor as the propulsion source. The propulsion source may be a hybrid structure including both an internal combustion engine and an electric motor or a structure including any one of an internal combustion engine and an electric motor. In case that the propulsion source is an internal combustion engine, biomass-derived fuel such as ethanol or fuel gas including hydrocarbon, hydrogen, and the like may be used as the fuel in addition to gasoline and diesel fuel.

It is to be noted that the vehicle included the vehicle in the notification system 10 may be a sports-driving vehicle. The sports-driving vehicle is mainly for hobbies and the frequency of sports driving or the degree of sports driving varies with each user. A maintenance notification time thus varies much in accordance with the magnitude of the driving state. The use of the notification system described above facilitates an appropriate notification timing to be offered to each of such sports-driving vehicles in accordance with a driving situation. A preferred sports-driving vehicle is sometimes referred to as a recreational vehicle (RV) and includes a buggy, a snowmobile, a boat, an all-terrain vehicle (ATV), a side-by-side vehicle, a motorcycle, and the like.

In addition, the vehicle included in the notification system 10 may be not only a vehicle owned by an individual, but a wheeled vehicle managed/used by a group such as a corporation or the administration. In particular, in case that a plurality of vehicles is managed, the use frequency and the driving state vary. The use of the notification system 10 thus makes it possible to offer different maintenance notification timings to the respective wheeled vehicles. It is thus possible to suppress unnecessary maintenance and execute efficient maintenance. In case that a plurality of vehicles is managed, farm work, construction work, renting business, and the like are conceivable in which a plurality of vehicles is supposed to be used at the same time.

Another Embodiment 15

The portable device 20 may be configured as a wearable terminal such as a watch wearable on a user or may be a function accompanying a key that starts the vehicle 70. In other words, it is sufficient if the portable device 20 is capable of acquiring the driving information from the vehicle 70 and includes a notification function. The portable device 20 does not have to include a calling (telephone) function.

It is also possible to implement the present disclosure in various forms other than those described above. For example, it is possible to implement the present disclosure in the form of a computer program that implements a function of at least one of the portable device 20, the first controller 105, the second controller 51, or the third controller 213, a non-transitory recording medium (non-transitory storage medium) in which the computer program is recorded, or the like. For example, the computer program may be a program that causes a computer to execute: acquiring, by a portable device, driving information from the vehicle through communication, the driving information indicating a driving state of the vehicle; and outputting notification information regarding the maintenance of the vehicle to a notification device included in the portable device in case that the driving information satisfies a predefined advance notification condition.

It is possible to execute a function of an element disclosed herein by using a circuit or a processing circuit including a general-purpose processor, a dedicated processor, an integrated circuit, ASICs (Application Specific Integrated Circuits), a conventional circuit, and/or a combination thereof configured or programed to execute the disclosed function. A processor includes a transistor and another circuit and is thus considered a processing circuit or a circuit. In the present disclosure, a circuit, a unit, or means is hardware that executes the listed functions or hardware programed to execute the listed functions. The hardware may be the hardware disclosed herein or other known hardware programed or configured to execute the listed functions. In case that the hardware is a processor that is considered a type of circuit, a circuit, means, or a unit is a combination of hardware and software and the software is used to configure the hardware and/or the processor.

What is claimed is:

1. A notification method of issuing a notification of arrival of maintenance time of a vehicle, the notification method comprising:

acquiring, by a portable device which is a communication terminal that is carried by a user, driving information from the vehicle through communication, the driving information indicating a driving state of the vehicle, the driving information including a driving integrated value that increases with driving of the vehicle;

acquiring, by the portable device through wireless communication from the vehicle, identification information for identifying the vehicle, the identification information being stored in a memory of the vehicle;

acquiring, by the portable device through wireless communication from the vehicle, a driving integrated value that increases with driving of the vehicle;

executing, by the portable device, a maintenance notification when the identification information acquired from the vehicle corresponds to identification information stored in a memory of the portable device and when a count amount obtained by counting the driving integrated value from a predetermined time reaching a preset maintenance setting value; and generating, by the portable device, maintenance notification information regarding the maintenance of the vehicle in case that the identification information acquired from the vehicle corresponds to identification information stored in the memory of the portable device and when the driving information satisfies a notification condition including a count amount reaches a preset maintenance setting value, the count amount being obtained by counting the driving integrated value from a predetermined time, the count amount indicating a driving time or a driving distance of the vehicle accumulated from the predetermined time; and outputting the maintenance notification information that has been generated.

2. The notification method according to claim 1, wherein:

the notification condition is defined on a basis of a condition inputted by a user to an input device provided to the portable device.

3. The notification method according to claim 1, wherein:

the maintenance notification information is information having a different output aspect from advance notification information such that a user can recognize a difference between the pieces of notification information, the maintenance notification information includes a first notification indicating that the count amount reaches a preset advance setting value and a second notification indicating the count amount reaches another setting value, and a notification mode of the first notification is different from a notification mode of a second notification.

4. The notification method according to claim 1, wherein:

the maintenance notification information is information having a different output aspect from advance notification information such that a user can recognize a difference between the pieces of notification information, and in case that an input device provided to the portable device receives an instruction by a user to stop outputting the maintenance notification information, the notification condition is reset.

5. The notification method according to claim 1, wherein:

the maintenance notification information is information having a different output aspect from advance notification information such that a user can recognize a difference between the pieces of notification information, and in case that an input device provided to the portable device receives an instruction by a user to change the notification condition, the notification condition is changed in accordance with the instruction.

6. The notification method according to claim 1, wherein:

the maintenance notification information is information having a different output aspect from advance notification information such that a user can recognize a difference between the pieces of notification information, and in case that an input device provided to the portable device receives an instruction by a user to stop outputting the maintenance notification information, information that prompts the notification condition to be reset is outputted.

7. The notification method according to claim 3, wherein:

the maintenance notification information is information having a different output aspect from the advance notification information such that a user can recognize a difference between the pieces of notification information, the notification condition includes an advance notification condition and a maintenance notification condition, the advance notification condition including the count amount reaching the advance setting value, the maintenance notification condition including the count amount reaching the maintenance setting value, the maintenance notification information includes the advance notification information and maintenance notification information different from the advance notification information, the advance notification information being outputted in a period of time from satisfaction of the advance notification condition to satisfaction of the maintenance notification condition, the maintenance notification information being outputted in a period of time after the satisfaction of the maintenance notification condition, and the notification mode of the advance notification information is different from the maintenance notification information.

8. The notification method according to claim 1, wherein a driving log including the driving information about the vehicle for each predetermined time is generated and the generated driving log is outputted.

9. The notification method according to claim 1, wherein, in case that an input device provided to the portable device receives execution information, input by a user, regarding execution of the maintenance of the vehicle, a maintenance history of the vehicle is generated by using the execution information.

10. The notification method according to claim 1, wherein the vehicle is an off-roading wheeled vehicle.

11. The notification method according to claim 1, wherein the vehicle includes balloon tires and a ROPS (rollover protective structure).

12. The notification method according to claim 1, wherein:

the maintenance notification information is information having a different output aspect from the advance notification information, and the maintenance notification information is configured in an emphasized display aspect as compared with the advance notification information.

13. The notification method according to claim 1, wherein:

the portable device is configured to store, in a memory, identification information of a plurality of vehicles in association with each other.

14. The notification method according to claim 1, wherein:

the driving integrated value is stored in a nonvolatile memory of the vehicle and is updated and stored in association with driving of the vehicle.

15. The notification method according to claim 1, wherein:

after completion of setting, the portable device transmits, to a controller of the vehicle, a request signal including identification information stored in a memory of the portable device, and when supplied with power, the controller of the vehicle receives the request signal from the portable device, and transmits the driving integrated value to the portable device when the identification information included in the request signal matches identification information stored in a memory of the vehicle.

* * * * *